US012804583B2

(12) United States Patent
Kim

(10) Patent No.: US 12,804,583 B2
(45) Date of Patent: Nov. 17, 2026

(54) METHOD AND APPARATUS FOR PERFORMING SIDELINK POSITIONING BASED ON SIDELINK DISCOVERY IN WIRELESS COMMUNICATION SYSTEM

(71) Applicants: BLACKPIN Inc., Seoul (KR); Soenghun Kim, Hanam-si (KR)

(72) Inventor: Soenghun Kim, Hanam-si (KR)

(73) Assignees: BLACKPIN INC., Seoul (KR); Soenghun Kim, Hanam-si (KR)

( * ) Notice: Subject to any disclaimer, the term of this patent is extended or adjusted under 35 U.S.C. 154(b) by 447 days.

(21) Appl. No.: 18/385,343

(22) Filed: Oct. 30, 2023

(65) Prior Publication Data

US 2024/0155539 A1 May 9, 2024

(30) Foreign Application Priority Data

Nov. 4, 2022 (KR) ........................ 10-2022-0145831

(51) Int. Cl.
*H04W 64/00* (2009.01)
*H04W 48/16* (2009.01)
*H04W 72/25* (2023.01)

(52) U.S. Cl.
CPC ........... *H04W 64/00* (2013.01); *H04W 48/16* (2013.01); *H04W 72/25* (2023.01)

(58) Field of Classification Search
CPC ..... H04W 64/00; H04W 48/16; H04W 72/25; H04W 48/12; H04W 76/14; H04W 8/005; H04W 8/26; H04W 24/08; H04W 48/08
See application file for complete search history.

(56) References Cited

U.S. PATENT DOCUMENTS 10,757,550 B2 8/2020 Lee et al.
12,241,988 B2 3/2025 Baek et al.
(Continued)

FOREIGN PATENT DOCUMENTS

KR 10-2158628 B1 9/2020
KR 10-2021-0125418 A 10/2021
(Continued)

OTHER PUBLICATIONS

3GPP TS 38.321 V17.2.0 (Sep. 2022); Technical Specification; 3rd Generation Partnership Project; Technical Specification Group Radio Access Network; NR; Medium Access Control (MAC) protocol specification (Release 17).
(Continued)

*Primary Examiner* — Diane D Mizrahi
(74) *Attorney, Agent, or Firm* — Nicholas Park

(57) ABSTRACT

A Method and Apparatus for sidelink positioning is provided. The method includes receiving a SystemInformationBlock12 in a first cell, performing sidelink discovery based on the SL-ConfigCommonNR, receiving from a type2 UE a first SPP message, and performing sidelink positioning in the first cell based on the Pos_5G-S-TMSI and a Sl_Pos_ResourcePool IE of the one or more Sl_Pos_ResourcePool IEs. The SystemInformationBlock12 includes a SL-ConfigCommonNR and a SL_Pos_ConfigCommon. The SL_Pos_ConfigCommon includes a one or more Sl_Pos_ResourcePool IEs. The first SPP message includes the Pos_5G-S-TMSI of the type2 UE. The Pos_5G-S-TMSI is a temporary terminal identity provided by LMF.

4 Claims, 9 Drawing Sheets

(56) References Cited

U.S. PATENT DOCUMENTS

| | | | | |
|---|---|---|---|---|
| 2023/0101824 A1* | 3/2023 | Baek | H04W 64/00 | |
| | | | 455/522 | |
| 2023/0156857 A1 | 5/2023 | Hong | | |

FOREIGN PATENT DOCUMENTS

| | | | |
|---|---|---|---|
| KR | 10-2022-0084061 A | 6/2022 | |
| WO | WO 2022/019714 A1 | 1/2022 | |
| WO | WO 2022/195487 A1 | 9/2022 | |

OTHER PUBLICATIONS

3GPP TS 38.331 V17.2.0 (Sep. 2022); Technical Specification; 3rd Generation Partnership Project; Technical Specification Group Radio Access Network; NR; Radio Resource Control (RRC) protocol specification (Release 17).
3GPP TS 37.355 V17.2.0 (Sep. 2022); Technical Specification; 3rd Generation Partnership Project; Technical Specification Group Radio Access Network; LTE Positioning Protocol (LPP) (Release 17).
Vivo, "Discussion on sidelink positioning," 3GPP TSG-RAN WG2 Meeting #119 electronic,e-Meeting, R2-2207081, Aug. 15-29, 2022.
OPPO, "Discussion of sidelink positioning," 3GPP TSG-RAN WG2 #119 electronic, Online, R2-2207090, Aug. 2022.
CATT, "SL Positioning Architecture and Protocol Stack," 3GPP TSG RAN WG2 Meeting #119-e, Electronic, R2-2207106, Aug. 17-26, 2022.
Nokia et al., "Discussion of sidelink positioning procedures," 3GPP TSG-RAN WG2 Meeting #119 Electronic, Elbonia, R2-2207229, Aug. 15-26, 2022.
Intel Corporation, "Support of sidelink positioning," 3GPP TSG RAN WG2 Meeting #119-e, Electronic Meeting, R2-2207388, Aug. 2022.
Apple, "On sidelink Positioning Architecture," 3GPP TSG-RAN WG2 Meeting #119-e, Online, R2-2207435, Aug. 2022.
Zte et al., "Discussion on sidelink positioning," 3GPP TSG-RAN WG2 Meeting #119 electronic, Online, R2-2207586, Aug. 17-29, 2022.
Spreadtrum Communications, "Discussion on potential solutions for SL positioning," 3GPP TSG-RAN WG2 Meeting #119-e,Online, R2-2207684, Aug. 17-29, 2022.
Sony, "Considerations on sidelink positioning," 3GPP TSG RAN WG2 Meeting #119-electronic,Online meeting, R2-2207828, Aug. 17-26, 2022.
Huawei et al., "Discussion on sidelink positioning," 3GPP TSG-RAN WG2 #119e,E-meeting, R2-2207868, Aug. 17-29, 2022.
Ericsson, "SL positioning," 3GPP TSG-RAN WG2 Meeting #119-e,e-Meeting, R2-2208080, Aug. 17-29, 2022.
Qualcomm Incorporated, "Study of Sidelink Positioning Architecture, Signaling and Procedures," 3GPP TSG RAN WG2 Meeting #119-e, E-meeting, R2-2208126, Aug. 17-26, 2022.
Philips International B.V., "Protocol considerations for sidelink positioning," 3GPP TSG-RAN WG2 Meeting #119e, e-Meeting, R2-2208253, Aug. 17-29, 2022.
Samsung, "Discussion on functions of LMF in SL positioning," 3GPP TSG RAN WG2 Meeting #119-e,Electronic, R2-2208301,Aug. 17- 26, 2022.
Samsung, "Discussion on out-of-coverage sidelink positioning," 3GPP TSG RAN WG2 Meeting #119-e, Electronic, R2-2208320, Aug. 17-26, 2022.
CMCC, "Initial considerations on Sidelink positioning," 3GPP TSG-RAN WG2 Meeting #119 electronic, Online, R2-2208453, Aug. 17-29, 2022.
Xiaomi, "Discussion on SL positioning," 3GPP TSG-RAN2 #119, Online, R2-2208582, Aug. 17-29, 2022.
Nokia et al., "Discussion of sidelink positioning procedures," 3GPP TSG-RAN WG2 Meeting #119 Electronic, Elbonia, R2-2208685, Aug. 15-26, 2022.
Office Action in Korean Appln. No. 10-2022-0145831, mailed on Oct. 27, 2025, 11 pages (with English translation).

* cited by examiner

METHOD AND APPARATUS FOR PERFORMING SIDELINK POSITIONING BASED ON SIDELINK DISCOVERY IN WIRELESS COMMUNICATION SYSTEM

CROSS-REFERENCE TO RELATED APPLICATION

This application claims priority to and the benefit of Korean Patent Application No. 10-2022-0145831, filed on Nov. 4, 2022, the disclosure of which is incorporated herein by reference in its entirety.

BACKGROUND

Technical Field

The present disclosure relates to sidelink positioning in wireless communication system.

Related Art

To meet the increasing demand for wireless data traffic since the commercialization of 4th generation (4G) communication systems, the 5th generation (5G) system is being developed. For the sake of high data rate, 5G system introduced millimeter wave (mmW) frequency bands (e.g. 60 GHz bands). In order to increase the propagation distance by mitigating propagation loss in the 5G communication system, various techniques are introduced such as beamforming, massive multiple-input multiple output (MIMO), full dimensional MIMO (FD-MIMO), array antenna, analog beamforming, and large-scale antenna. In addition, base station is divided into a central unit and plurality of distribute units for better scalability. To facilitate introduction of various services, 5G communication system targets supporting high data rate and low transmission latency.

The importance of accurate and rapid positioning is increasing day by day. To this end, a method of measuring the location of the terminal using the sidelink of the 5G mobile communication system is required.

SUMMARY

Aspects of the present disclosure are to address the various methods of implementing sidelink positioning in mobile communication system. Accordingly, an aspect of the present disclosure is to provide a method and an apparatus for receiving a SystemInformationBlock12 in a first cell, performing sidelink discovery based on the SL-ConfigCommonNR, receiving from a type2 UE a first SPP message, and performing sidelink positioning in the first cell based on the Pos_5G-S-TMSI and a Sl_Pos_ResourcePool IE of the one or more Sl_Pos_ResourcePool IEs. The SystemInformationBlock12 includes a SL-ConfigCommonNR and a SL_Pos_ConfigCommon. The SL_Pos_ConfigCommon includes a one or more Sl_Pos_ResourcePool IEs. The first SPP message includes the Pos_5G-S-TMSI of the type2 UE. The Pos_5G-S-TMSI is a temporary terminal identity provided by LMF.

DETAILED DESCRIPTION

Figure 1A:
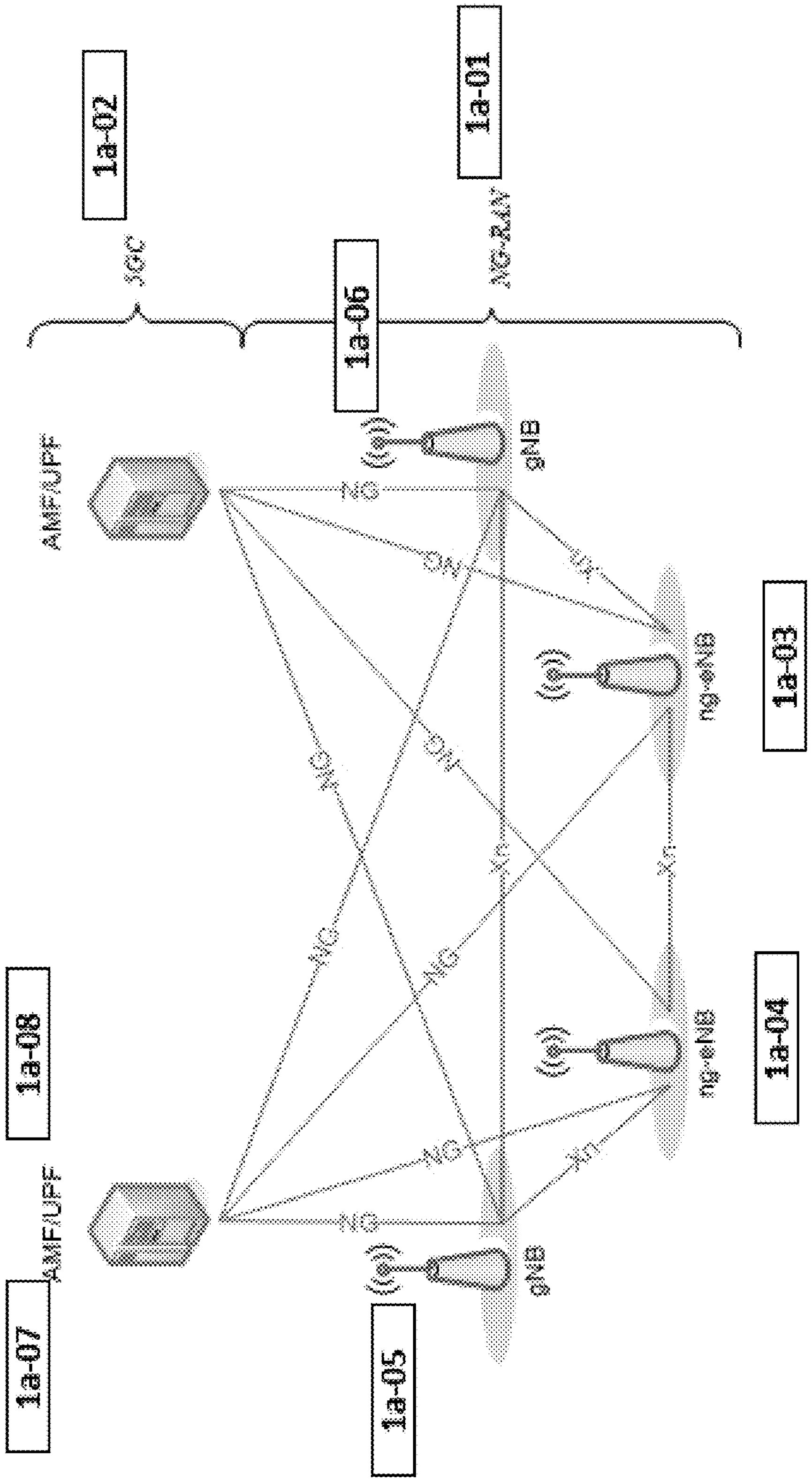
FIG. 1A is a diagram illustrating the architecture of an 5G system and a NG-RAN.

Hereinafter, embodiments of the present invention will be described in detail with reference to the accompanying drawings. In addition, in the description of the present invention, if it is determined that a detailed description of a related known function or configuration may unnecessarily obscure the gist of the present invention, the detailed description thereof will be omitted. In addition, the terms to be described later are terms defined in consideration of functions in the present invention, which may vary according to intentions or customs of users and operators. Therefore, the definition should be made based on the content throughout this specification.

The terms used, in the following description, for indicating access nodes, network entities, messages, interfaces between network entities, and diverse identity information is provided for convenience of explanation. Accordingly, the terms used in the following description are not limited to specific meanings but may be replaced by other terms equivalent in technical meanings.

In the following descriptions, the terms and definitions given in the 3GPP standards are used for convenience of explanation. However, the present disclosure is not limited by use of these terms and definitions and other arbitrary terms and definitions may be employed instead.

Table 1 lists the acronyms used throughout the present disclosure.

TABLE 1

| Acronym | Full name |
|---|---|
| 5GC | 5G Core Network |
| ACK | Acknowledgement |
| AM | Acknowledged Mode |
| AMF | Access and Mobility Management Function |
| ARQ | Automatic Repeat Request |
| AS | Access Stratum |
| ASN.1 | Abstract Syntax Notation One |
| BSR | Buffer Status Report |
| BWP | Bandwidth Part |
| CA | Carrier Aggregation |
| CAG | Closed Access Group |
| CG | Cell Group |
| C-RNTI | Cell RNTI |
| CSI | Channel State Information |

TABLE 1-continued

| Acronym | Full name |
|---|---|
| DCI | Downlink Control Information |
| DRB | (user) Data Radio Bearer |
| DRX | Discontinuous Reception |
| HARQ | Hybrid Automatic Repeat Request |
| IE | Information element |
| LCG | Logical Channel Group |
| MAC | Medium Access Control |
| MIB | Master Information Block |
| NAS | Non-Access Stratum |
| NG-RAN | NG Radio Access Network |
| NR | NR Radio Access |
| PBR | Prioritised Bit Rate |
| PCell | Primary Cell |
| PCI | Physical Cell Identifier |
| PDCCH | Physical Downlink Control Channel |
| PDCP | Packet Data Convergence Protocol |
| PDSCH | Physical Downlink Shared Channel |
| PDU | Protocol Data Unit |
| PHR | Power Headroom Report |
| PLMN | Public Land Mobile Network |
| PRACH | Physical Random Access Channel |
| PRB | Physical Resource Block |
| PSS | Primary Synchronisation Signal |
| PUCCH | Physical Uplink Control Channel |
| PUSCH | Physical Uplink Shared Channel |
| RACH | Random Access Channel |
| RAN | Radio Access Network |
| RA-RNTI | Random Access RNTI |
| RAT | Radio Access Technology |
| RB | Radio Bearer |
| RLC | Radio Link Control |
| RNA | RAN-based Notification Area |
| RNAU | RAN-based Notification Area Update |
| RNTI | Radio Network Temporary Identifier |
| RRC | Radio Resource Control |
| RRM | Radio Resource Management |
| RSRP | Reference Signal Received Power |
| RSRQ | Reference Signal Received Quality |
| RSSI | Received Signal Strength Indicator |
| SCell | Secondary Cell |
| SCS | Subcarrier Spacing |
| SDAP | Service Data Adaptation Protocol |
| SDU | Service Data Unit |
| SFN | System Frame Number |
| S-GW | Serving Gateway |
| SI | System Information |
| SIB | System Information Block |
| SpCell | Special Cell |
| SRB | Signalling Radio Bearer |

TABLE 1-continued

| Acronym | Full name |
|---|---|
| SRS | Sounding Reference Signal |
| SSB | SS/PBCH block |
| SSS | Secondary Synchronisation Signal |
| SUL | Supplementary Uplink |
| TM | Transparent Mode |
| UCI | Uplink Control Information |
| UE | User Equipment |
| UM | Unacknowledged Mode |
| CRP | Cell Reselection Priority |
| FPP | First positioning protocol |
| SPP | Second positioning protocol |
| DL-PRS | Downlink-Positioning Reference Signal |
| SL-PRS | Sidelink-Positioning Reference Signal |

Table 2 lists the terminologies and their definition used throughout the present disclosure.

TABLE 2

| Terminology | Definition |
|---|---|
| Carrier frequency | center frequency of the cell. |
| Cell | combination of downlink and optionally uplink resources. The linking between the carrier frequency of the downlink resources and the carrier frequency of the uplink resources is indicated in the system information transmitted on the downlink resources. |
| Cell Group | in dual connectivity, a group of serving cells associated with either the MeNB or the SeNB. |
| Cell reselection | A process to find a better suitable cell than the current serving cell based on the system information received in the current serving cell |
| Cell selection | A process to find a suitable cell either blindly or based on the stored information |
| Dedicated signalling | Signalling sent on DCCH logical channel between the network and a single UE. |
| discardTimer | Timer to control the discard of a PDCP SDU. Starting when the SDU arrives. Upon expiry, the SDU is discarded. |
| F | The Format field in MAC subheader indicates the size of the Length field. |
| Field | The individual contents of an information element are referred to as fields. |
| Frequency layer | set of cells with the same carrier frequency. |
| Global cell identity | An identity to uniquely identifying an NR cell. It is consisted of cellIdentity and plmn-Identity of the first PLMN-Identity in plmn-IdentityList in SIB1. |
| gNB | node providing NR user plane and control plane protocol terminations towards the UE, and connected via the NG interface to the 5GC. |
| Handover | procedure that changes the serving cell of a UE in RRC_CONNECTED. |
| Information element | A structural element containing single or multiple fields is referred as information element. |

TABLE 2-continued

| Terminology | Definition |
| --- | --- |
| L | The Length field in MAC subheader indicates the length of the corresponding MAC SDU or of the corresponding MAC CE |
| LCID | 6 bit logical channel identity in MAC subheader to denote which logical channel traffic or which MAC CE is included in the MAC subPDU |
| MAC-I | Message Authentication Code-Integrity. 16 bit or 32 bit bit string calculated by NR Integrity Algorithm based on the security key and various fresh inputs |
| Logical channel | a logical path between a RLC entity and a MAC entity. There are multiple logical channel types depending on what type of information is transferred e.g. CCCH (Common Control Channel), DCCH (Dedicate Control Channel), DTCH (Dedicate Traffic Channel), PCCH (Paging Control Channel) |
| Logical ChannelConfig | The IE LogicalChannelConfig is used to configure the logical channel parameters. It includes priority, prioritisedBitRate, allowedServingCells, allowedSCS-List, maxPUSCH-Duration, logicalChannelGroup, allowedCG-List etc |
| logical ChannelGroup | ID of the logical channel group, as specified in TS 38.321, which the logical channel belongs to |
| MAC CE | Control Element generated by a MAC entity. Multiple types of MAC CEs are defined, each of which is indicated by corresponding LCID. A MAC CE and a corresponding MAC sub-header comprises MAC subPDU |
| Master Cell Group | in MR-DC, a group of serving cells associated with the Master Node, comprising of the SpCell (PCell) and optionally one or more SCells. |
| maxPUSCH-Duration | Restriction on PUSCH-duration for the corresponding logical channel. If present, UL MAC SDUs from this logical channel can only be transmitted using uplink grants that result in a PUSCH duration shorter than or equal to the duration indicated by this field. Otherwise, UL MAC SDUs from this logical channel can be transmitted using an uplink grant resulting in any PUSCH duration. |
| NR | NR radio access |
| PCell | SpCell of a master cell group. |
| registered PLMN | PLMN which UE has registered to |
| selected PLMN | PLMN which UE has selected to perform registration procedure |
| equivalent PLMN | PLMN which is equivalent to registered PLMN. UE is informed of list of EPLMNs by AMF during registration procedure |
| PLMN ID Check | the process that checks whether a PLMN ID is the RPLMN identity or an EPLMN identity of the UE. |
| Primary Cell | The MCG cell, operating on the primary frequency, in which the UE either performs the initial connection establishment procedure or initiates the connection re-establishment procedure. |
| Primary SCG Cell | For dual connectivity operation, the SCG cell in which the UE performs random access when performing the Reconfiguration with Sync procedure. |
| priority | Logical channel priority, as specified in TS 38.321. an integer between 0 and 7. 0 means the highest priority and 7 means the lowest priority |

TABLE 2-continued

| Terminology | Definition |
| --- | --- |
| PUCCH SCell | a Secondary Cell configured with PUCCH. |
| Radio Bearer | Logical path between a PDCP entity and upper layer (i.e. SDAP entity or RRC) |
| RLC bearer | RLC and MAC logical channel configuration of a radio bearer in one cell group. |
| RLC bearer configuration | The lower layer part of the radio bearer configuration comprising the RLC and logical channel configurations. |
| RX_DELIV | This state variable indicates the COUNT value of the first PDCP SDU not delivered to the upper layers, but still waited for. |
| RX_NEXT | This state variable indicates the COUNT value of the next PDCP SDU expected to be received. |
| RX_REORD | This state variable indicates the COUNT value following the COUNT value associated with the PDCP Data PDU which triggered t-Reordering. |
| Serving Cell | For a UE in RRC_CONNECTED not configured with CA/DC there is only one serving cell comprising of the primary cell. For a UE in RRC_CONNECTED configured with CA/DC the term 'serving cells' is used to denote the set of cells comprising of the Special Cell(s) and all secondary cells. |
| SpCell | primary cell of a master or secondary cell group. |
| Special Cell | For Dual Connectivity operation the term Special Cell refers to the PCell of the MCG or the PSCell of the SCG, otherwise the term Special Cell refers to the PCell. |
| SRB | Signalling Radio Bearers" (SRBs) are defined as Radio Bearers (RBs) that are used only for the transmission of RRC and NAS messages. |
| SRB0 | SRB0 is for RRC messages using the CCCH logical channel |
| SRB1 | SRB1 is for RRC messages (which may include a piggybacked NAS message) as well as for NAS messages prior to the establishment of SRB2, all using DCCH logical channel; |
| SRB2 | SRB2 is for NAS messages and for RRC messages which include logged measurement information, all using DCCH logical channel. SRB2 has a lower priority than SRB1 and may be configured by the network after AS security activation; |
| SRB3 | SRB3 is for specific RRC messages when UE is in (NG)EN-DC or NR-DC, all using DCCH logical channel |
| SRB4 | SRB4 is for RRC messages which include application layer measurement reporting information, all using DCCH logical channel. |
| CCCH | CCCH is a logical channel to transfer initial RRC messages such as RRCSetupRequest, RRCResumeRequest and RRCSetup |
| DCCH | DCCH is a logical channel to transfer RRC messages after RRC connection establishment |
| TRP | A set of geographically co-located antennas (e.g. antenna array (with one or more antenna elements)) supporting TP and/or RP functionality. |
| Suitable cell | A cell on which a UE may camp. Following criteria apply<br>The cell is part of either the selected PLMN or the registered PLMN or PLMN of the Equivalent PLMN list<br>The cell is not barred<br>The cell is part of at least one TA that is not part of the list of "Forbidden Tracking Areas for Roaming" |

TABLE 2-continued

| Terminology | Definition |
|---|---|
| | (TS 22.011 [18]), which belongs to a PLMN that fulfils the first bullet above. The cell selection criterion S is fulfilled (i.e. RSRP and RSRQ are better than specific values |

In the disclosure, "trigger" or "triggered" and "initiate" or "initiated" may be used interchangeably.

In the disclosure, "radio bearers allowed for SDT", "radio bearers for which SDT is configured", and "radio bearers for which SDT is enabled" may be used interchangeably.

In the disclosure, terminal and UE may be used interchangeably. In the disclosure, base station and NG-RAN node and GNB may be used interchangeably.

FIG. 1A is a diagram illustrating the architecture of an 5G system and a NG-RAN to which the disclosure may be applied.

5G system consists of NG-RAN 1A-01 and 5GC 1A-02. An NG-RAN node is either:

- a gNB, providing NR user plane and control plane protocol terminations towards the UE; or
- an ng-eNB, providing E-UTRA user plane and control plane protocol terminations towards the UE.

The gNBs 1A-05 or 1A-06 and ng-eNBs 1A-03 or 1A-04 are interconnected with each other by means of the Xn interface. The gNBs and ng-eNBs are also connected by means of the NG interfaces to the 5GC, more specifically to the AMF (Access and Mobility Management Function) and to the UPF (User Plane Function). AMF 1A-07 and UPF 1A-08 may be realized as a physical node or as separate physical nodes.

A gNB 1A-05 or 1A-06 or an ng-eNBs 1A-03 or 1A-04 hosts the functions listed below.

- Functions for Radio Resource Management such as Radio Bearer Control, Radio Admission Control, Connection Mobility Control, Dynamic allocation of resources to UEs in uplink, downlink and sidelink(scheduling); and
- IP and Ethernet header compression, uplink data decompression and encryption of user data stream; and
- Selection of an AMF at UE attachment when no routing to an MME can be determined from the information provided by the UE; and
- Routing of User Plane data towards UPF; and
- Scheduling and transmission of paging messages; and
- Scheduling and transmission of broadcast information (originated from the AMF or O&M); and
- Measurement and measurement reporting configuration for mobility and scheduling; and
- Session Management; and
- QoS Flow management and mapping to data radio bearers; and
- Support of UEs in RRC_INACTIVE state; and
- Radio access network sharing; and
- Tight interworking between NR and E-UTRA; and
- Support of Network Slicing.

The AMF 1A-07 hosts the functions such as NAS signaling, NAS signaling security, AS security control, SMF selection, Authentication, Mobility management and positioning management.

The UPF 1A-08 hosts the functions such as packet routing and forwarding, transport level packet marking in the uplink, QoS handling and the downlink, mobility anchoring for mobility etc.

Figure 1B:
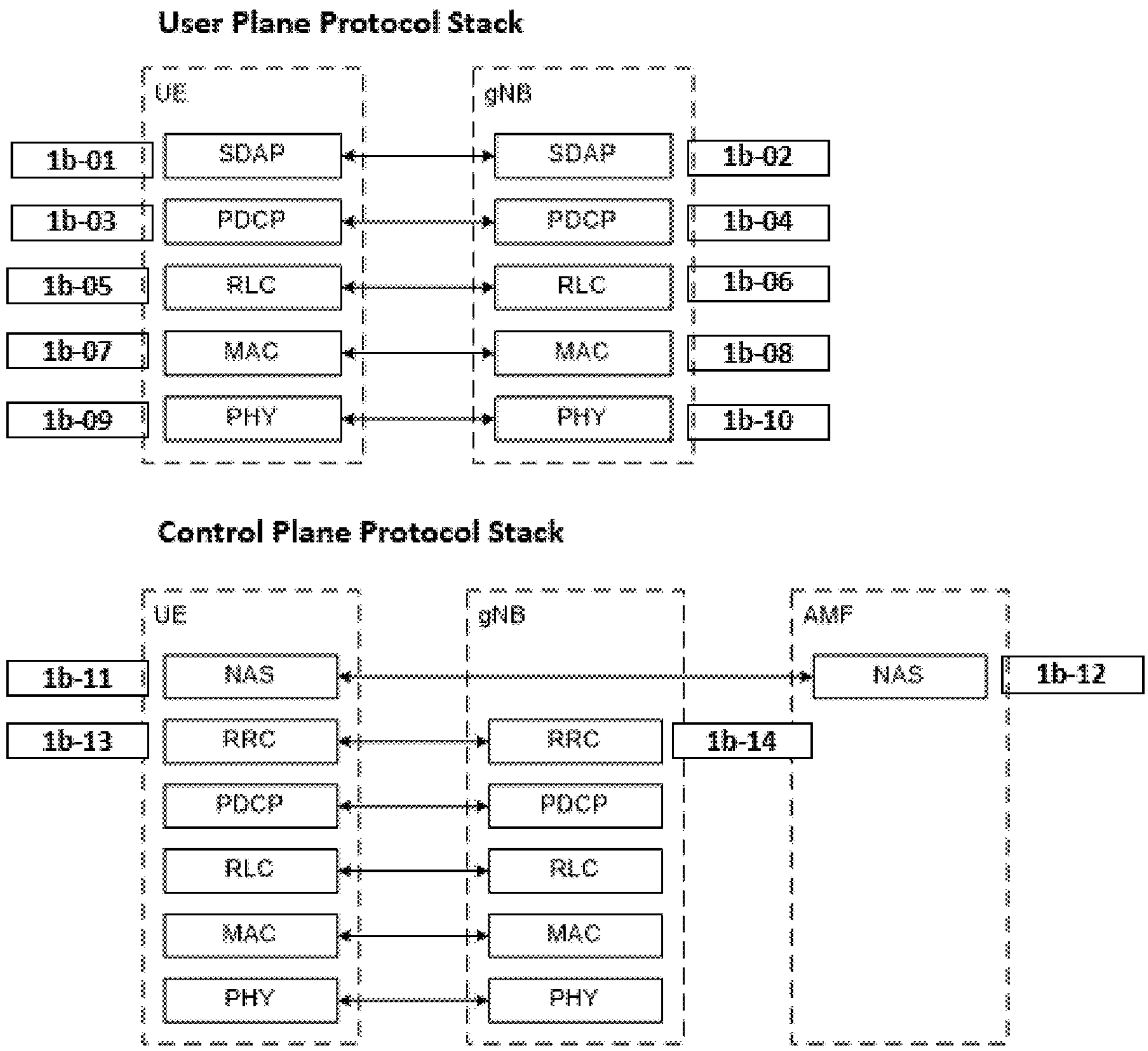
FIG. 1B is a diagram illustrating a wireless protocol architecture in an 5G system.

FIG. 1B is a diagram illustrating a wireless protocol architecture in an 5G system to which the disclosure may be applied.

User plane protocol stack consists of SDAP 1B-01 or 1B-02, PDCP 1B-03 or 1B-04, RLC 1B-05 or 1B-06, MAC 1B-07 or 1B-08 and PHY 1B-09 or 1B-10. Control plane protocol stack consists of NAS 1B-11 or 1B-12, RRC 1B-13 or 1B-14, PDCP, RLC, MAC and PHY.

Each protocol sublayer performs functions related to the operations listed in the table 3.

TABLE 3

| Sublayer | Functions |
|---|---|
| NAS | authentication, mobility management, security control etc |
| RRC | System Information, Paging, Establishment, maintenance and release of an RRC connection, Security functions, Establishment, configuration, maintenance and release of Signalling Radio Bearers (SRBs) and Data Radio Bearers (DRBs), Mobility, QOS management, Detection of and recovery from radio link failure, NAS message transfer etc. |
| SDAP | Mapping between a QoS flow and a data radio bearer, Marking QoS flow ID (QFI) in both DL and UL packets. |
| PDCP | Transfer of data, Header compression and decompression, Ciphering and deciphering, Integrity protection and integrity verification, Duplication, Reordering and in-order delivery, Out-of-order delivery etc. |
| RLC | Transfer of upper layer PDUs, Error Correction through ARQ, Segmentation and re-segmentation of RLC SDUs, Reassembly of SDU, RLC re-establishment etc. |
| MAC | Mapping between logical channels and transport channels, Multiplexing/demultiplexing of MAC SDUs belonging to one or different logical channels into/from transport blocks (TB) delivered to/from the physical layer on transport channels, Scheduling information reporting, Priority handling between UEs, Priority handling between logical channels of one UE etc. |
| PHY | Channel coding, Physical-layer hybrid-ARQ processing, Rate matching, Scrambling, Modulation, Layer mapping, Downlink Control Information, Uplink Control Information etc. |

Figure 1C:
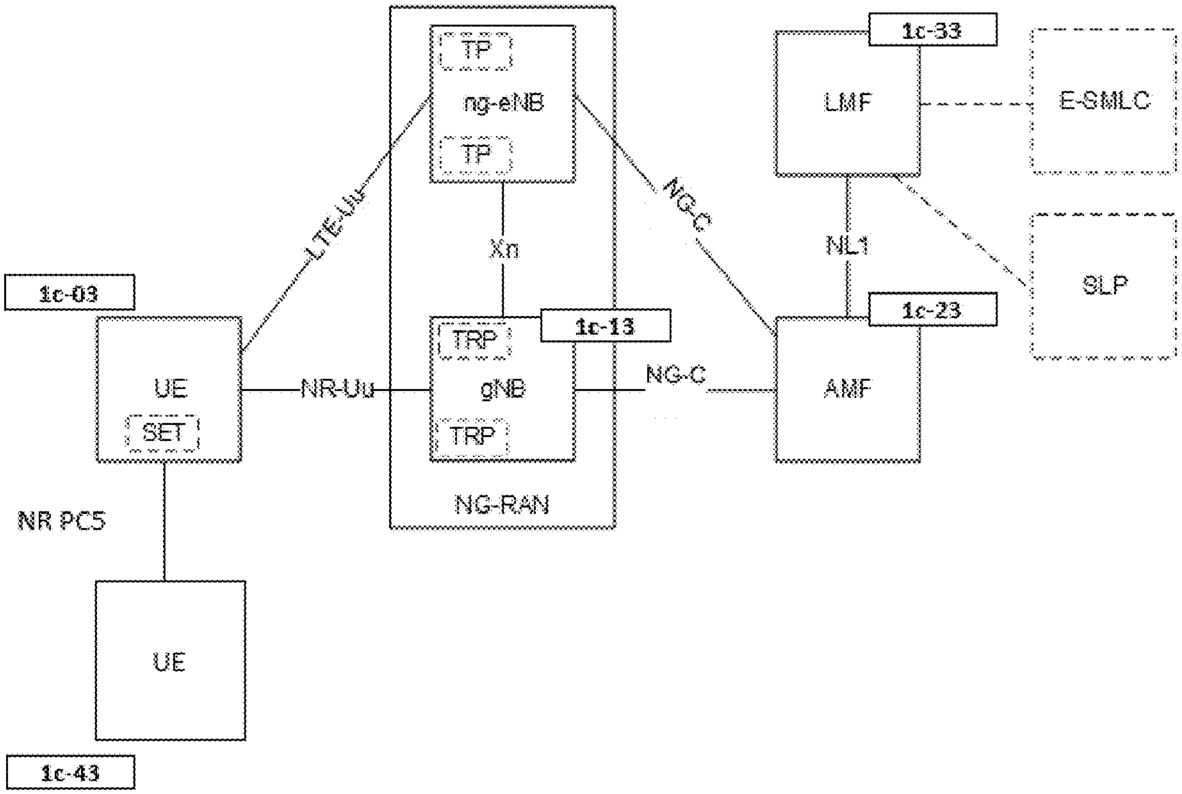
FIG. 1C is a diagram illustrating a architecture of a positioning system.

FIG. 1C is a diagram illustrating a structure of a positioning system according to an embodiment of the present disclosure.

The terminal 1C-03 is connected to the LMF 1C-33 through the gNB 1C-13 and the AMF 1C-23. Hereinafter, gNB is also referred to as a base station, AMF as an access mobility function, and LMF as a location management function.

The base station provides the TRP function. AMF stores the capability of the terminal related to location confirmation and relays the signaling between the location management function and the terminal. AMF may be connected to several base stations. One AMF can be connected to several LMFs. The AMF may initially select the LMF for any terminal. The AMF may select another LMF when the terminal moves to a new cell.

The LMF manages the support of different location services for target UEs, including positioning of UEs and delivery of assistance data to UEs.

The LMF may interact with a target UE in order to deliver assistance data if requested for a particular location service, or to obtain a location estimate if that was requested.

For positioning of a target UE, the LMF decides on the position methods to be used The positioning methods may yield a location estimate for UE-based position methods and/or positioning measurements for UE-assisted and network-based position methods. The LMF may combine all the received results and determine a single location estimate for the target UE (hybrid positioning). Additional information like accuracy of the location estimate and velocity may also be determined.

The terminal 1C-43 is connected to the terminal 1C-03 via PC5 interface and sidelink. The terminal 1C-43 and the terminal 1C-03 can perform sidelink positioning based on the SL-PRS.

Figure 1D:
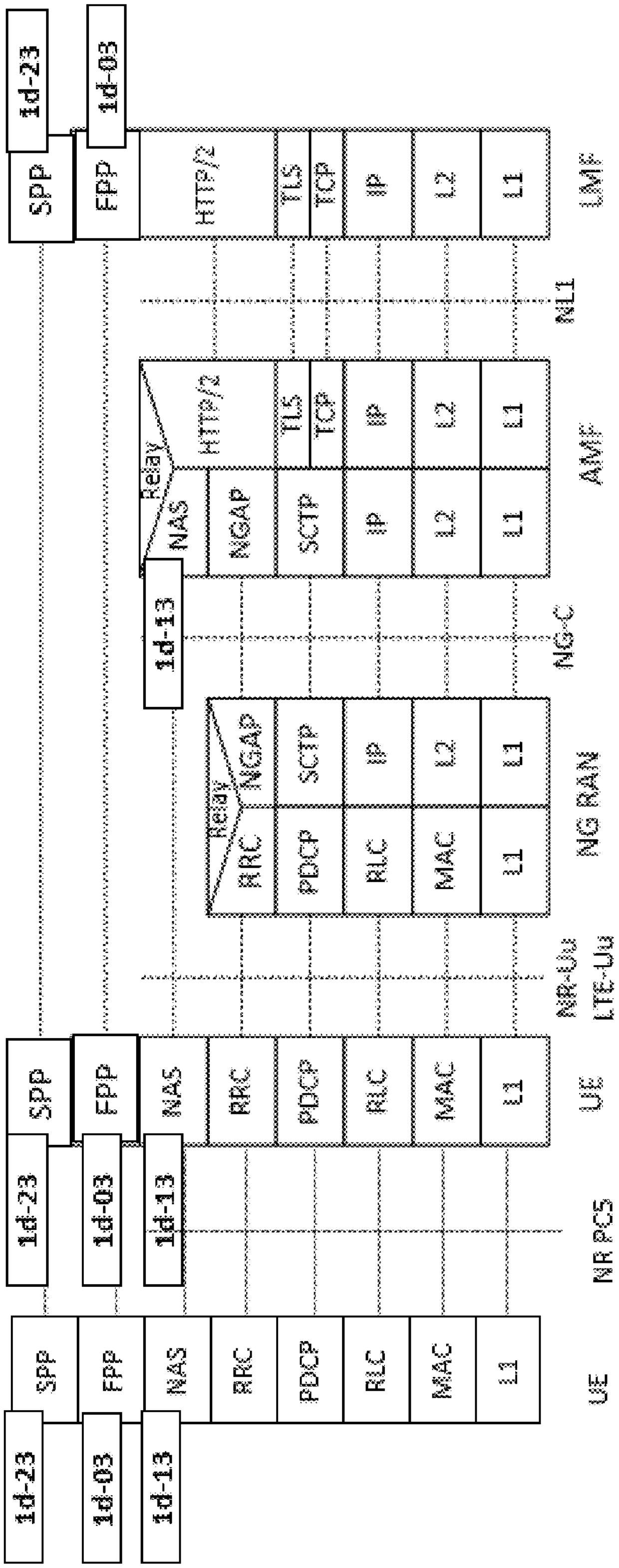
FIG. 1D is a diagram illustrating a protocol architecture for signaling between a location management function and a terminal

FIG. 1D is a diagram illustrating a protocol hierarchical structure for signaling between a location management function and a terminal according to an embodiment of the present disclosure.

The terminal and LMF exchange signaling through FPP 1D-03. FPP defines various control messages related to positioning. The FPP control message is included in the NAS 1D-13 message and delivered to the AMF, and the AMF delivers the FPP control message included in the NAS message to the LMF.

FPP (First Positioning Protocol) is a protocol to control various positioning method based on DL-PRS and SRS.

A terminal and another terminal or a terminal and LMF exchanges sidelink related signaling through SPP 1D-23 (Second Positioning Protocol). The SPP control message is transmitted and received included in FPP control message.

SPP is a protocol to control sidelink positioning.

In the disclosure, following terminologies are used interchangeably.

Target device and target UE, SL-PRS and sidelink positioning, Type1 UE and target UE, Type2 UE and anchor UE.

Anchor UE is a UE supporting positioning target UE, e.g., by transmitting and/or receiving reference signals for positioning, providing positioning-related information, etc., over the PC5 interface.

Target UE is a UE to be positioned.

Sidelink positioning is positioning a UE using reference signals transmitted over SL, i.e., PC5 interface, to obtain absolute position, relative position, or ranging information.

Downlink positioning is positioning a UE using reference signals transmitted over downlink.

For synchronization in Uu interface, UE receives Synchronization Signal and PBCH block (SSB) from the GNB.

For synchronization with another UE in PC5 interface, UE receives S-SS/PSBCH block from the UE.

SSB consists of primary synchronization signals and secondary synchronization signals and PBCH. In time domain, a SSB is transmitted over 6 consecutive symbols of a slot. The slot occurs periodically.

A S-SS/PSBCH block is transmitted over 13 symbols of a slot. The slot occurs every 16 frames.

Figure 2A:
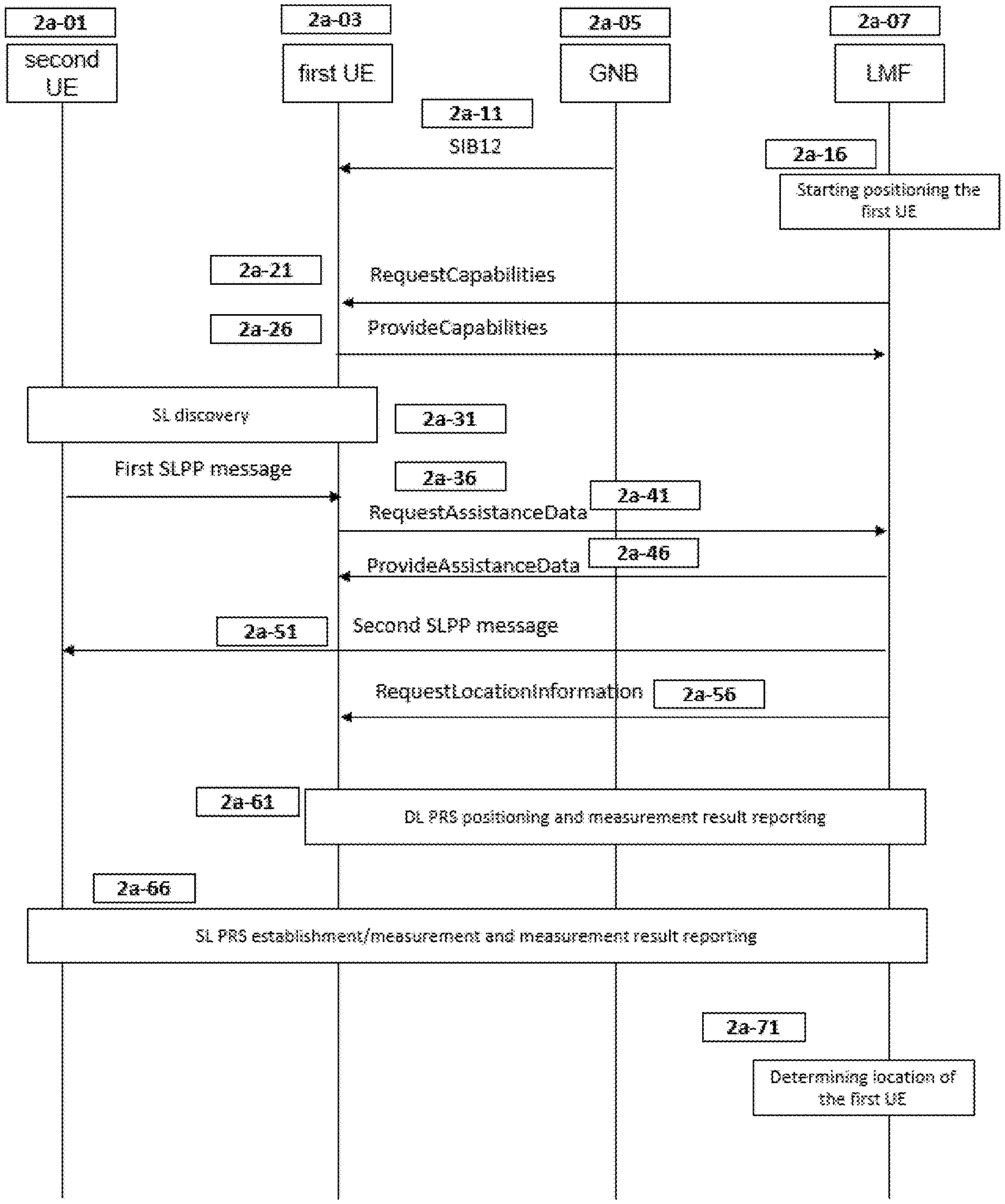
FIG. 2A is a diagram illustrating positioning operation performed based on DL-PRS and SL-PRS.

FIG. 2A illustrates positioning operation performed based on DL-PRS and SL-PRS.

In 2A-11, the first UE receives a SystemInformationBlock12 in a first cell from the GNB. The SystemInformationBlock12 includes an IE SL-ConfigCommonNR and an IE SL_Pos_ConfigCommon and a sl-PositioningAllowed field.

The sl-PositioningAllowed field indicates, if present, the support of SL positioning in the first cell.

The IE SL-ConfigCommonNR indicates the configuration of NR sidelink communication and discovery.

The IE Sl_Pos_ConfigCommon indicates the configuration of NR sidelink for SL-PRS transmission and reception.

The IE SL-ConfigCommonNR includes following IEs and fields.

One or more SL-FreqConfigCommon IEs: Each SL-FreqConfigCommon IE specifies the cell-specific configuration information on one particular carrier frequency for NR sidelink communication.

One or more SL-RadioBearerConfig IEs: Each SL-RadioBearerConfig IE specifies the sidelink DRB configuration information for NR sidelink communication.

One or more SL-RLC-BearerConfig IEs: Each SL-RLC-BearerConfig IE specifies the SL RLC bearer configuration information for NR sidelink communication.

A SL-MeasConfigCommon IE: This IE indicates the measurement configurations (e.g. RSRP) for NR sidelink communication.

Each SL-FreqConfigCommon IE includes following IE and fields.

A sl-AbsoluteFrequencyPointA field: This field indicates absolute frequency of the reference resource block (Common RB 0).

A sl-AbsoluteFrequencySSB field: This field indicates the frequency location of sidelink SSB.

One or more SL-BWP-ConfigCommon IEs: Each SL-BWP-ConfigCommon is used to configure the cell-specific configuration information on one particular sidelink bandwidth part.

One or more SL-SyncConfig IEs: Each SL-SyncConfig IE specifies the configuration information concerning reception of synchronisation signals from neighbouring cells as well as concerning the transmission of synchronisation signals for sidelink communication.

Each SL-BWP-ConfigCommon includes following IEs and fields.

A SL-BWP-Generic IE. This IE indicates the generic parameters on the configured sidelink BWP. This IE includes following fields.

sl-LengthSymbols indicates the number of symbols used for sidelink in a slot without SL-SSB.

sl-StartSymbol field indicates the starting symbol used for sidelink in a slot without SL-SSB.

locationAndBandwidth field indicates frequency domain location and bandwidth of this bandwidth part. The value of the field shall be interpreted as resource indicator value (RIV).

subcarrierSpacing indicates subcarrier spacing to be used in this BWP for all channels and reference signals.

SL-BWP-PoolConfigCommon IE. This IE indicates the resource pool configurations on the configured sidelink BWP. This IE includes one or more SL-ResourcePool IEs for NR side link communication reception (i.e. reception resource pool) and one or more SL-ResourcePool IEs for NR side link communication transmission (i.e. transmission resource pool). Each of one or more transmission resource pool is associated with a SL-ResourcePoolID.

SL-BWP-DiscPoolConfigCommon IE. This IE indicates the NR sidelink discovery dedicated resource pool configurations on the configured sidelink BWP. This IE includes one or more SL-ResourcePool IEs for NR sidelink discovery dedicated resource pool.

Each SL-ResourcePool IE includes following IEs and fields.

sl-NumSubchannel indicates the number of subchannels in the corresponding resource pool, which consists of contiguous PRBs only.

sl-RB-Number field indicates the number of PRBs in the corresponding resource pool, which consists of contiguous PRBs only.

sl-StartRB-Subchannel indicates the lowest RB index of the subchannel with the lowest index in the resource pool with respect to the lowest RB index of a SL BWP.

sl-SubchannelSize indicates the minimum granularity in frequency domain for the sensing for PSSCH resource selection in the unit of PRB.

sl-SyncAllowed indicates the allowed synchronization reference(s) which is (are) allowed to use the configured resource pool.

sl-TimeResource indicates the bitmap of the resource pool, which is defined by repeating the bitmap with a periodicity during a SFN or DFN cycle.

sl_Pos_Allowed indicates sidelink positioning is (are) allowed to use the configured resource pool. SL-ResourcePool is used for sidelink positioning if Sl_Pos_ResourcePool is not configured.

SL-PSCCH-Config IE. This IE indicates PSCCH configuration. This IE includes following fields.

sl-FreqResourcePSCCH field indicates the number of PRBs for PSCCH in a resource pool. sl-DMRS-ScrambleID indicates the initialization value for PSCCH DMRS scrambling. sl-NumReservedBits indicates the number of reserved bits in first stage SCI. sl-TimeResourcePSCCH indicates the number of symbols of PSCCH in a resource pool.

SL-PSSCH-Config IE. This IE indicates PSSCH configuration. This IE includes following fields.

sl-BetaOffsets2ndSCI indicates candidates of beta-offset values to determine the number of coded modulation symbols for second stage SCI.

sl-PSSCH-DMRS-TimePatternList indicates the set of PSSCH DMRS time domain patterns in terms of PSSCH DMRS symbols in a slot that can be used in the resource pool.

SL-PowerControl IE. This IE indicates power control configuration. This IE includes following fields.

sl-MaxTransPower indicates the maximum value of the UE's sidelink transmission power on this resource pool. The unit is dBm.

The IE Sl_Pos_ConfigCommon includes following IEs and fields.

One or more Sl_Pos_ResourcePool IEs. Each Sl_Pos_ResourcePool IE specifies the cell-specific configuration information on one particular resource pool for NR SL positioning.

Sl_Pos_subcarrierSpacing indicates subcarrier spacing to be used for sidelink positioning. It applies to all resource pools configured by SL_Pos_ResourcePool IEs.

Each Sl_Pos_ResourcePool IE includes following IEs and fields.

Sl_Pos_ResourcePoolID indicates the index (or ID) of the resource pool used for SL Positioning (or SL-PRS transmission and reception).

Sl_Pos_AbsoluteFrequency indicates absolute frequency of lowest PRB of the resource pool.

Sl_Pos_StartPRB specifies the start PRB index defined as offset with respect to subcarrier 0 in common resource block 0 for the corresponding resource pool.

Sl_Pos_RB-Number indicates the number of PRBs in the corresponding resource pool, which consists of contiguous PRBs only.

Sl_Pos_LengthSymbols indicates the number of symbols used for sidelink positioning in a slot without SL-SSB.

Sl_Pos_StartSymbol field indicates the starting symbol used for sidelink positioning in a slot without SL-SSB.

Sl_Pos_TimeResource indicates the bitmap of the resource pool, which is defined by repeating the bitmap with a periodicity during a SFN or DFN cycle.

In 2A-16, LMF determines to perform positioning of the first UE.

In 2A-21, LMF transmits to the first UE a RequestCapabilities message. The RequestCapabilities message includes a NR-DL-TDOA-RequestCapabilities IE and a NR_SL_Positioning RequestCapabilities IE.

The IE NR-DL-TDOA-RequestCapabilities is used by the location server to request NR DL-TDOA positioning capabilities from a target device. NR DL-TDOA positioning is performed based on DL-PRS.

The IE NR_SL_Positioning RequestCapabilities is used by the location server to request NR SL positioning capabilities from a target device. SL positioning is performed based on SL-PRS.

In 2A-26, the first UE transmits to the LMF a ProvideCapabilities. The ProvideCapabilities includes an IE NR-DL-TDOA-ProvideCapabilities and an IE NR_SL_Positioning_ProvideCapabilities.

The IE NR-DL-TDOA-ProvideCapabilities includes a mg-ActivationRequest field and a supportOfDL-PRS-RSRP-MeasFR1 field and a supportOfDL-PRS-RSRP-MeasFR2 field.

The mg-ActivationRequest field indicates that the target device supports low latency measurement gap activation request for DL-PRS measurements.

The supportOfDL-PRS-RSRP-MeasFR1 field indicates whether the target device supports DL-PRS measurement for RSRP in FR1.

The supportOfDL-PRS-RSRP-MeasFR2 field indicates whether the target device supports DL-PRS measurement for RSRP in FR2.

The IE NR_SL_Positioning_ProvideCapabilities includes a supportOfSL_PRS_RSRP_MeasFR1 field and a supportOfSL_PRS_RSRP_MeasFR2 field and a supportOfSL_PRS_TxFR1 field and a supportOfSL_PRS_TxFR2 field and a supportOfSL_PRS_ActivationRequest field.

The supportOfSL_PRS_RSRP_MeasFR1 field indicates whether the target device supports SL-PRS measurement for RSRP in FR1.

The supportOfSL_PRS_RSRP_MeasFR2 field indicates whether the target device supports SL-PRS measurement for RSRP in FR2.

The supportOfSL_PRS_TxFR1 field indicates whether the target device supports SL-PRS transmission in FR1.

The supportOfSL_PRS_TxFR2 field indicates whether the target device supports SL-PRS transmission in FR2.

The supportOfSL_PRS_ActivationRequest field indicates the target device supports SL-PRS activation request via SL MAC CEs.

SL MAC CE is a MAC CE transmitted and received via sidelink.

In 2A-31, the target UE performs NR sidelink discovery to find candidates for anchor UE. The first UE discovers the second UE as a candidate for the anchor UE, In 2A-36, the second UE transmits to the first UE a first SPP message. The first SPP message includes an IE_related_to_high_layer_anchor_UE_ID and IE_related_to_anchor_UE_ID and 5G-S-TMSI IE.

IE_related_to_high_layer_anchor_UE_ID is a pos_5G-S-TMSI of the second UE.

5G-S-TMSI is a 5G S-Temporary Mobile Subscription Identifier (5G-S-TMSI), a temporary UE identity provided by the 5GC (AMF) which uniquely identifies the UE within the tracking area.

Pos_5G-S-TMSI is a temporary UE identity provided by LMF in ProvideCapabilities message or in ProvideAssistanceData message or in a fifth SPP message.

A Pos_5G-S-TMSI is associated with a 5G-S-TMSI. Both are 48 bit long.

5G-S-TMSI is used to uniquely identify the corresponding UE within a tracking area by the AMF.

Pos_5G-S-TMSI is used to uniquely identify the corresponding UE within a tracking area during a positioning session by the LMF.

IE_related_to_anchor_UE_ID indicates the UE ID of the anchor UE. It includes SL-SourceIdentity (or Layer-2 ID) of the second UE.

SL-SourceIdentity is used to identify a destination of a NR sidelink communication. It is 24 bit long.

In 2A-41, the first UE transmits to the LMF a RequestAssistanceData message. The RequestAssistanceData message includes following fields and IEs.

nr-PhysCellID field specifies the NR physical cell identity of the current primary cell of the target device.

nr-AdType field indicates the requested assistance data. dl-prs means requested assistance data is nr-DL-PRS-AssistanceData. sl_prs means requested assistance data is assistance data for sidelink PRS.

One or more IE_related_to_high_layer_anchor_UE_ID. Each of IE_related_to_high_layer_anchor_UE_ID indicates a candidate type2 UE discovered during the SL discovery procedure.

An IE_related_to_high_layer_target_UE_ID is a pos_5G-S-TMSI of the first UE.

preferred_SL_PRS IE indicates the preferred SL PRS configuration.

In 2A-46, the first UE receives from the LMF a ProvideAssistanceData message. The ProvideAssistanceData message includes following fields and IEs.

nr-DL-PRS-AssistanceData field specifies the assistance data reference and neighbour TRPs and provides the DL-PRS configuration for the TRPs.

IE_related_to_selected_UE-ID includes a pos_5G-S-TMSI of a type2 UE (or anchor UE) selected for SL positioning (the second UE in this example).

LMF selects the anchor UE from the candidate UEs reported in the RequestedAssistanceData.

In 2A-51, the second UE receives from the LMF a second SPP message. The purpose is to provide the second UE relevant information for sidelink positioning.

The LMF may receive more than one IE_related_to_high_layer_anchor_UE_ID. The LMF selects one of them for type2 UE of the SL positioning. LMF transmits the second SPP message to the selected type2 UE.

The second SPP message includes following fields and IEs.

IE_related_to target UE ID indicates a type1 UE of SL positioning (the first UE in this example). It includes pos_5G-S-TMSI of the first UE.

preferred_SL_PRS IE indicates the preferred SL PRS configuration.

The second UE may prepare configuration of the required SL-PRS based on the information in the preferred_SL_PRS IE.

In 2A-56, the first UE receives from the LMF a RequestLocationInformation message. LMF may decide to command the first UE and the second UE to perform positioning measurement. The LMF transmits to the target device the RequestLocationInformation message.

The RequestLocationInformation includes following IEs and fields.

locationInformationType field indicates whether the server requires a location estimate or measurements. For 'locationEstimateRequired', the target device shall return a location estimate. For 'locationMeasurementsRequired', the target device shall return measurements.

triggeredReporting field indicates that triggered reporting is requested.

periodicalReporting field indicates that periodic reporting is requested.

The IE NR-DL-AoD-RequestLocationInformation is used by the location server to request NR DL-AoD location measurements from a target device based on DL-PRS.

The IE NR_SL_RequestLocationInformation is used by the location server to request NR SL location measurement from a target device based on SL-PRS.

The NR_SL_RequestLocationInformation IE includes following fields and IEs.

IE_related_to_LOS includes information indicating that the target device is requested to provide the indicated type and granularity of the estimated LOS-NLOS-Indicator for the SL-PRS nr-SL_PRS_RstdMeasurementInfoRequest field indicates whether the target device is requested to report SL-PRS Resource ID(s) or SL-PRS Resource Set ID(s) used for determining the timing of each UE in RSTD measurements.

NR_SL_AssistanceAvailability field indicates whether the target device may request additional SL-PRS assistance data from the anchor UE. TRUE means allowed and FALSE means not allowed.

Sl-lowerRxBeamSweepingFactor-FR2 field indicates that the target device is requested to use a lower Rx beam sweeping factor than 8 for FR2 for SL-PRS measurement.

IE_related_to_high_layer_anchor_UE_ID includes a UE identifier of the type2 UE (or anchor UE). The UE identifier can be a pos_5G-S-TMSI of the second UE.

In 2A-61, the first UE performs DL PRS measurement based on the ProvideAssisanceData message and the RequestLocationInformation message. Upon completion of DL PRS measurement, the first UE performs DL PRS measurement reporting toward the LMF.

In 2A-66 the first UE and the second UE performs SL PRS establishment and SL PRS measurement. Upon completion of SL PRS measurement, the first UE and the second UE performs SL-PRS measurement reporting toward LMF.

In 2A-71, LMF determines the location of the UE based on the reported measurement result.

Figure 2B:
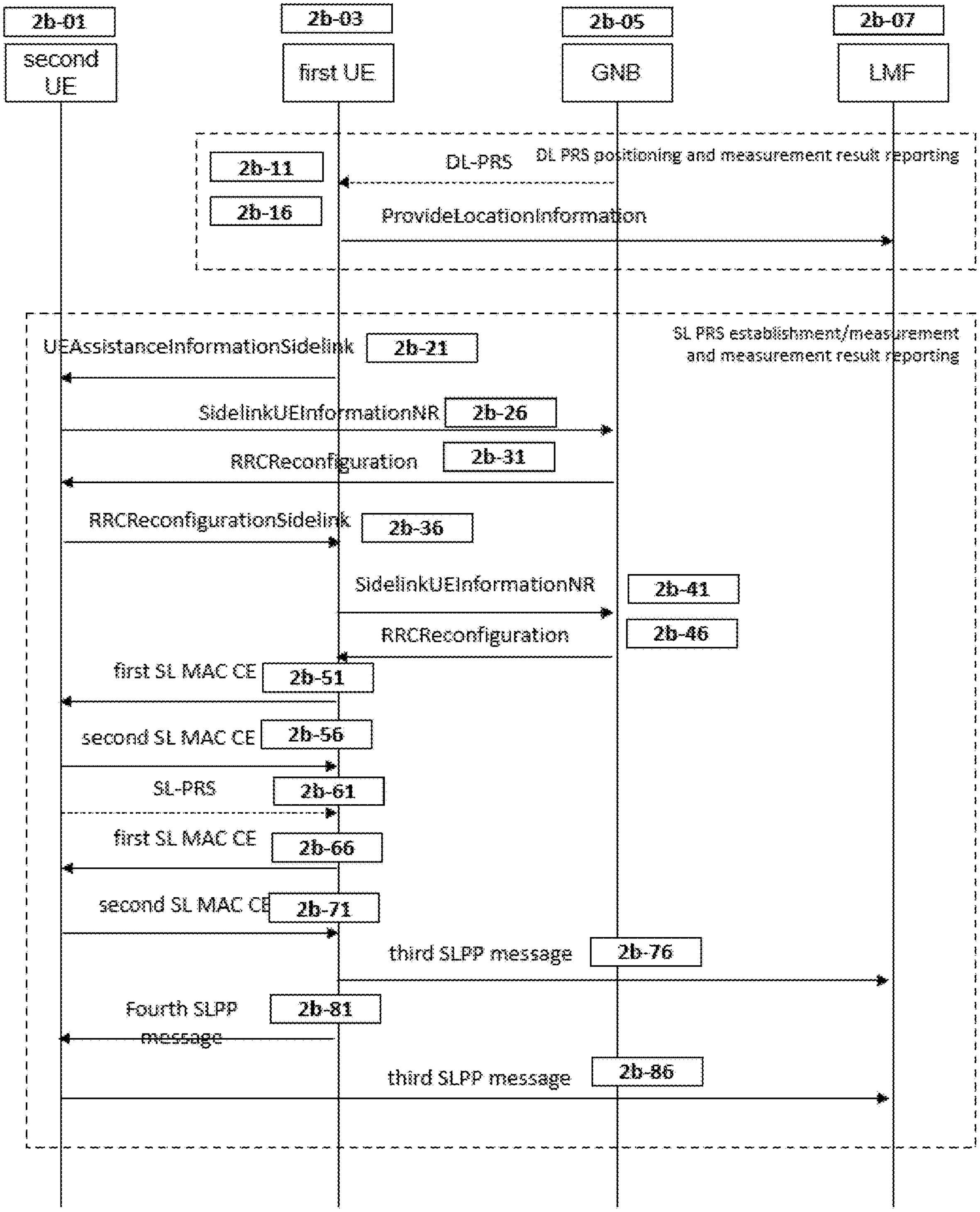
FIG. 2B is a diagram illustrating DL PRS measurement/reporting and SL PRS establishment/measurement/reporting.

FIG. 2B illustrates DL PRS measurement/reporting and SL PRS establishment/measurement/reporting.

In 2B-11, GNB transmits DL-PRS. DL-PRS is transmitted according to nr-DL-PRS-AssistanceData field in ProvideAssistanceData message.

The UE can be configured with one or more DL PRS resource set configuration(s). Each DL PRS resource set consists of one or more DL PRS resource(s) where each has an associated spatial transmission filter.

A DL PRS resource set is configured by NR-DL-PRS-ResourceSet. A DL PRS resource set consists of one or more DL PRS resources.

A DL PRS resource set is defined by the following fields included in NR-DL-PRS-ResourceSet IE.

nr-DL-PRS-ResourceSetID field defines the identity of the DL PRS resource set configuration.

dl-PRS-Periodicity-and-ResourceSetSlotOffset field defines the DL PRS resource periodicity and the slot offset for DL PRS resource set with respect to SFN0 slot 0. All the DL PRS resources within one DL PRS resource set are configured with the same DL PRS resource periodicity.

dl-PRS-ResourceRepetitionFactor defines how many times each DL-PRS resource is repeated for a single instance of the DL-PRS resource set.

dl-PRS-ResourceTimeGap field defines the offset in number of slots between two repeated instances of a DL PRS resource with the same nr-DL-PRS-ResourceID within a single instance of the DL PRS resource set.

NR-DL-PRS-SFN0-Offset field defines the time offset of the SFN0 slot 0 for the DL PRS resource set with respect to SFN0 slot 0 of reference provided by nr-DL-PRS-ReferenceInfo. The nr-DL-PRS-ReferenceInfo field includes a DL-PRS-ID-Info IE. The DL-PRS-ID-Info IE includes a dl-PRS-ID field and a nr-DL-PRS-ResourceSetID field.

dl-PRS-ResourceList field determines the DL PRS resources that are contained within one DL PRS resource set. It includes one or more nr-DL-PRS-Resource IEs.

dl-PRS-ResourceBandwidth field defines the number of resource blocks configured for DL PRS transmission. The parameter has a granularity of 4 PRBs with a minimum of 24 PRBs and a maximum of 272 PRBs. All DL PRS resources sets within a positioning frequency layer have the same value of dl-PRS-ResourceBandwidth.

dl-PRS-StartPRB field defines the starting PRB index of the DL PRS resource with respect to reference Point A, where reference Point A is given by the higher-layer parameter dl-PRS-PointA.

dl-PRS-NumSymbols field defines the number of symbols of the DL PRS resource within a slot.

A DL PRS resource is defined by the following fields.

nr-DL-PRS-ResourceID field determines the DL PRS resource configuration identity. All DL PRS resource IDs are locally defined within a DL PRS resource set.

dl-PRS-SequenceID field is used to initialize pseudo random sequence generator for generation of DL PRS sequence for a given DL PRS resource.

dl-PRS-CombSizeN-AndReOffset field defines the starting RE offset of the first symbol within a DL PRS resource in frequency. The relative RE offsets of the remaining symbols within a DL PRS resource.

dl-PRS-ResourceSlotOffset field determines the starting slot of the DL PRS resource with respect to corresponding DL PRS resource set slot offset.

dl-PRS-ResourceSymbolOffset field determines the starting symbol of a slot configured with the DL PRS resource.

dl-PRS-QCL-Info field defines any quasi co-location information of the DL PRS resource with other reference signals. The DL PRS may be configured with QCL 'typeD' with a DL PRS associated with the same dl-PRS-ID, or with rs-Type set to 'typeC', 'typeD', or 'typeC-plus-typeD' with a SS/PBCH Block from a serving or non-serving cell.

The first UE determines the first slots for the DL PRS resource based on dl-PRS-Periodicity-and-ResourceSetSlotOffset and dl-PRS-ResourceSlotOffset and dl-PRS-ResourceRepetitionFactor and dl-PRS-ResourceTimeGap.

The first UE determines the first symbols for the DL PRS resource based on dl-PRS-ResourceSymbolOffset and dl-PRS-NumSymbols.

The first UE determines the second symbols for the DL PRS resource by excluding symbols used by SS/PBCH block from the serving cell where DL-PRS is transmitted.

The first UE measures the DL-PRS resource in the second symbols of the first slots.

In 2B-16, the first UE transmits to the LMF a ProvideLocationInformation message. The purpose is to provide to the LMF measurement results on DL-PRS.

The ProvideLocationInformation includes following IEs and fields.

locationEstimate field provides a location estimate using one of the geographic shapes.

velocityEstimate field provides a velocity estimate using one of the velocity shapes.

IE_related_to_more_report includes information indicating whether more positioning measurement report will be sent and the type of positioning measurement report. The type could be SL positioning (or positioning measurement result based on SL-PRS).

dl-PRS-ID field is used along with a DL-PRS Resource Set ID and a DL-PRS Resources ID to uniquely identify a DL-PRS Resource.

nr-PhysCellID field specifies the physical cell identity of the associated TRP (or serving cell).

nr-CellGlobalID field specifies the NCGI, the globally unique identity of a cell in NR, of the associated TRP (or serving cell).

nr-ARFCN field specifies the NR-ARFCN of the TRP's CD-SSB corresponding to nr-PhysCellID.

nr-TimeStamp field specifies the time instance at which the TOA and DL PRS-RSRP/RSRPP (if included) measurement is performed. The nr-SFN and nr-Slot in IE NR-TimeStamp correspond to the TRP provided in dl-PRS-ReferenceInfo.

nr-DL-PRS-RSRP-Result field specifies the NR DL-PRS reference signal received power (DL PRS-RSRP) measurement.

nr-los-nlos-IndicatorPerResource field specifies the target device's best estimate of the LOS or NLOS of the TOA measurement for the resource.

LMF takes above information into account in estimating UE location.

2B-21 UEAssistanceInformationSidelink (IE_preferred_SL_PRS)

In 2B-21 the first UE transmits to the second UE a UEAssistanceInformationSidelink message. The purpose is to let the second UE know that the first UE requires SL-PRS transmission from the second UE.

The UEAssistanceInformationSidelink message includes following IEs and fields.

preferred_SL_PRS indicates the requested SL-PRS configuration provided by a target UE to a anchor UE for determining the SL-PRS configuration.

related_to_target_UE_ID indicates the UE ID of the target UE. It includes C-RNTI of the first UE or Layer-2 ID of the first UE.

preferred_SL_PRS includes following fields.

Time_To_Complete indicates a point of time until when the sidelink position should be completed (or until when SL-PRS measurement should be completed or until when SL-PRS transmission should start). It is absolute time information such as UTC time or GNSS time. Alternatively, it can be a relative time information such as the number of SFNs or msec.

Duration_SL_PRS indicates how long the SL-PRS transmission/reception should continue. It indicates a number of slots. The length of the slot is determined based on the SCS of the sidelink resource pool indicated by Resource_Pool_index_SL_PRS. The actual length of required SL-PRS transmission/reception is therefore determined by the value indicated in Sl_Pos_subcarrierSpacing and the value indicated in Duration_SL_PRS.

Periodicity_SL_PRS indicates the preferred periodicity of SL-PRS. The unit is a slot. The length of the unit is determined based on the SCS of the sidelink resource pool indicated by Resource_Pool_index_SL_PRS. The actual length of periodicity is therefore determined by the value indicated in Sl_Pos_subcarrierSpacing and the value indicated in Periodicity_SL_PRS.

Bandwidth_SL_PRS indicates the preferred bandwidth of SL-PRS. The unit is 4 PRBs. The bandwidth of a PRB is determined based on the SCS of the sidelink resource pool indicated by Resource_Pool_index_SL_PRS.

FR_SL_PRS indicates the preferred frequency region of the sidelink resource pool. UE includes this field if the preferred FR is different from the PCell's FR (or the specific serving cell's FR wherein the specific serving cell is the cell where the resource pool is configured).

Resource_Pool_index_SL_PRS indicates the preferred resource pool for SL-PRS (or SL positioning). It indicates one of Sl_Pos_ResourcePoolIDs.

In 2B-26 the second UE transmits to the GNB a SidelinkUEInformationNR message. The purpose is to request the SL-PRS configuration from the GNB.

The SidelinkUEInformationNR message includes requested_SL_PRS IE and ue_Type2 field and sl_Pos_Tx_Interested field and IE_related_to_target_UE_ID and IE_related_to_anchor_UE_ID.

Ue_Type2 field indicates either type1 UE (target UE) or type2 UE (anchor UE).

sl_Pos_Tx_Interested field indicates "true". If this field is included, it indicates the UE is interested in SL-PRS transmission. Alternatively, sl_Pos_Interested field can be used. The field indicates either transmission or reception or both.

IE_related_to_target_UE_ID indicates the UE ID of the target UE. It is C-RNTI of the first UE or SL-SourceIdentity. SL-SourceIdentity includes a Layer-2 ID of the first UE.

IE_related_to_anchor_UE_ID indicates the UE ID of the anchor UE. It includes SL-DestinationIdentity. SL-DestinationIdentity includes a Layer-2 ID of the second UE.

C-RNTI is allocated by GNB and 16 bit long. Layer2-ID is allocated by sidelink server and 24 bit long. C-RNTI is used for PDSCH/PUSCH operation in Uu interface. Layer2-ID is used for sidelink communication in PC5.

Requested_SL_PRS indicates the requested SL-PRS configuration provided by a anchor UE to a GNB for determining the SL-PRS configuration.

Requested_SL_PRS includes following fields.

Time_To_Complete indicates until when the sidelink position should be completed (or until when SL-PRS measurement should be completed or until when SL-PRS transmission should start).

Duration_SL_PRS indicates how long the SL-PRS transmission/reception should continue. The unit is a slot. The length of the unit is determined based on the SCS of the sidelink resource pool indicated by Resource_Pool_index_SL_PRS.

Periodicity_SL_PRS indicates the requested periodicity of SL-PRS in number of slots. The length of the unit is determined based on the SCS of the sidelink resource pool indicated by Resource_Pool_index_SL_PRS.

Bandwidth_SL_PRS indicates the requested bandwidth of SL-PRS. The unit is 4 PRBs. The bandwidth of a PRB is determined based on the SCS of the sidelink resource pool indicated by Resource_Pool_index_SL_PRS.

FR_SL_PRS indicates the requested frequency region of the sidelink resource pool. UE includes this field if the requested FR is different from the PCell's FR (or the specific serving cell's FR wherein the specific serving cell is the cell where the sidelink is configured).

Resource_Pool_index_SL_PRS indicates the requested resource pool for SL-PRS (or SL positioning). It is either a Sl_Pos_ResourcePoolID or a pair of a SL BWP ID and a SL-ResourcePoolID.

In 2B-31 the second UE receives from the GNB a RRCReconfiguration message. The purpose is to configure SL-PRS transmission and SLRB for the second UE.

The RRCReconfiguration message includes following IEs and fields.

One or more NR-SL_PRS_ResourceSet IE, a Sl_Pos_ResourcePool IE and a SL-RadioBearerConfig IE and SL-RLC-ChannelConfig IE.

Instead of the Sl_Pos_ResourcePool IE, Sl_Pos_ResourcePoolID IE can be included to indicate the configuration of the resource pool for SL positioning. Sl_Pos_ResourcePoolID indicates a sl_Pos_ResourcePool included in the system information.

If resource pool for SL positioning is not configured, a pair of a SL BWP ID and a SL-ResourcePoolID can be included to indicate the configuration of the resource pool. The SL BWP ID and the SL-ResourcePoolID indicates a SL_ResourcePool included in the system information.

SL-RadioBearerConfig IE includes following fields for a sidelink radio bearer for SPP message.

sl-PDCP-Config field indicates the PDCP parameters for the sidelink radio bearer.

sl-SDAP-Config field indicates how to map sidelink QoS flows to sidelink radio bearer.

sl-TransRange field indicates the transmission range of the sidelink radio bearer. The unit is meter.

SL-RLC-ChannelConfig IE includes following fields for sidelink radio bearer for SPP message.

sl-MAC-LogicalChannelConfig field is used to configure MAC SL logical channel parameters.

sl-RLC-Config indicates the RLC mode (UM, AM) and provides corresponding parameters.

sl-PacketDelayBudget indicates the Packet Delay Budget for a PC5 Relay RLC channel. Upper bound value for the delay that a packet may experience expressed in unit of 0.5 ms.

NR-SL_PRS_ResourceSet IE includes following fields and IEs.

nr-SL_PRS_ResourceSetID field defines the identity of the SL PRS resource set configuration.

SL_PRS_Periodicity-and-ResourceSetSlotOffset field defines the SL PRS resource periodicity and the slot offset for SL PRS resource set with respect to SFN0 slot 0 (or DFN0 slot0). All the SL PRS resources within one SL PRS resource set are configured with the same SL PRS resource periodicity.

SL_PRS_ResourceRepetitionFactor defines how many times each SL-PRS resource is repeated for a single instance of the SL-PRS resource set.

SL_PRS_ResourceTimeGap field defines the offset in number of slots between two repeated instances of a SL PRS resource with the same nr-SL_PRS_ResourceID within a single instance of the SL PRS resource set.

NR_SL_PRS-SFN0-Offset field defines the time offset of the SFN0 slot 0 (or DFN0 slot 0) for the SL PRS resource set with respect to SFN0 slot 0 of reference provided by nr_SL_PRS-ReferenceInfo. The nr_SL_PRS-ReferenceInfo field includes a SL-PRS-ID-Info IE. The SL-PRS-ID-Info IE includes a sl-PRS-ID field and a nr_SL_PRS-ResourceSetID field.

Alternatively, the SL-PRS-ID-Info IE includes a ARFCN and PCI (in case SFN0 slot0) of a reference cell or Layer-2 ID of a reference UE.

SL_PRS_ResourceList field determines the SL PRS resources that are contained within one SL PRS resource set. It includes one or more nr-SL_PRS_Resource IEs.

SL PRS ResourceBandwidth field defines the number of resource blocks configured for SL PRS transmission. The parameter has a granularity of 4 PRBs with a minimum of 24 PRBs and a maximum of 272 PRBs. All SL PRS resources transmitted from a type2 UE have the same value of SL_PRS_ResourceBandwidth.

SL_PRS_StartPRB field defines the starting PRB index of the SL PRS resource with respect to reference Point A, where reference Point A is given by the higher-layer parameter SL_PRS_PointA. All SL PRS resources transmitted from a type2 UE have the same value of SL_PRS_StartPRB.

SL_PRS_NumSymbols field defines the number of symbols of the SL PRS resource within a slot. All SL PRS resources transmitted from a type2 UE have the same value of SL_PRS_NumSymbols.

Sl_PRS_PointA specifies the absolute frequency of the reference resource block for the SL-PRS. A single SL-PRS Point A for SL-PRS Resource allocation is provided per pair of one Source Layer-2 ID and Destination Layer-2 ID. All SL-PRS Resources belonging to the same SL-PRS Resource Set have the same SL-PRS Point A.

A SL PRS resource is defined by the following fields in a nr-SL_PRS_Resource IE.

nr-SL_PRS_ResourceID field determines the SL PRS resource configuration identity. All SL PRS resource IDs are locally defined within a SL PRS resource set.

Sl_PRS_SequenceID field is used to initialize pseudo random sequence generator for generation of SL PRS sequence for a given SL PRS resource.

SL_PRS_CombSizeN-AndReOffset field defines the starting RE offset of the first symbol within a SL PRS resource in frequency. The relative RE offsets of the remaining symbols within a SL PRS resource are defined based on the initial offset.

SL_PRS_ResourceSlotOffset field determines the starting slot of the SL PRS resource with respect to corresponding SL PRS resource set slot offset.

SL_PRS_ResourceSymbolOffset field determines the starting symbol of a slot configured with the SL PRS resource.

SL_PRS-QCL-Info IE defines any quasi co-location information of the SL PRS resource with other reference signals. The SL PRS may be configured with QCL 'typeD' with a SL PRS associated with the same sl-PRS-ID, or with rs-Type set to 'typeC', 'typeD', or 'typeC-plus-typeD' with a SS/PBCH Block from a serving or non-serving cell or with a S-SS/PSBCH block (S-SSB) from an anchor UE.

SL_PRS-QCL-Info IE includes either ssb-Index and a serving cell index or ssb-Index and a Layer-2 ID of a UE. If only ssb-Index is present and Layer-2 ID is absent, the corresponding SL PRS resource is quasi co-located with the indicated S-SS/PSBCH block (S-SSB) from the anchor UE. If both ssb-Index and Layer-2 ID are present, the corresponding SL PRS resource is quasi co-located with the indicated S-SS/PSBCH block (S-SSB) from the UE indicated by Layer-2 ID.

In 2B-36 the second UE transmits to the first UE a RRCReconfigurationSidelink message. The purpose is to provide the first UE relevant information for SL positioning.

The RRCReconfigurationSidelink message includes following IEs and fields.

One or more NR-SL_PRS_ResourceSet IE, a Sl_Pos_ResourcePool IE and a and a SL-RadioBearerConfig IE and SL-RLC-ChannelConfig IE.

Instead of the Sl_Pos_ResourcePool IE, Sl_Pos_ResourcePoolID IE can be included to indicate the configuration of the resource pool for SL positioning. Sl_Pos_ResourcePoolID indicates a sl_Pos_ResourcePool indicated in the system information.

If resource pool for SL positioning is not configured, a pair of a SL BWP ID and a SL-ResourcePoolID can be included to indicate the configuration of the resource pool. The SL BWP ID and the SL-ResourcePoolID indicates a SL_ResourcePool indicated in the system information. The first UE and the second UE establishes PDCP entity and RLC entity and logical channel of a SL-SRB3 based on specified configuration. Specified configuration is specified and fixed in the standard.

In the NR-SL_PRS_ResourceSet IE, instead of SL_PRS-QCL, nr_SL_PRS_BeamInfo_List can be included.

nr_SL_PRS_BeamInfo_List field includes one or more NR_SL_PRS_BeamInfo. Each NR_SL_PRS_BeamInfo specifies the beam information of each SL-PRS resource ID.

The first UE and the second UE establishes PDCP entity and RLC entity and logical channel of a sidelink radio bearer for SPP based on the SL-RadioBearerConfig IE and the SL-RLC-ChannelConfig IE. The sidelink radio bearer for SPP is either SL-SRB5 or a SL-DRB.

Instead of providing the first UE the relevant IEs for side link positioning in RRCReconfigurationSidelink, the first UE can get the relevant IEs from the GNB via SidelinkUEInformationNR and RRCReconfiguration.

In 2B-41 the first UE transmits to the GNB a SidelinkUEInformationNR message. The purpose is to let GNB know that the first UE requires SL-PRS transmission from the second UE.

The SidelinkUEInformationNR message includes following IEs and fields.

The SidelinkUEInformationNR message includes preferred_SL_PRS IE and ue_Type2 field and sl_Pos_Rx_Interested field and IE_related_to_target_UE_ID and IE_related_to_anchor_UE_ID.

IE_related_to_anchor_UE_ID indicates the UE ID of the anchor UE. It includes C-RNTI of the second UE or SL-DestinationIdentity. SL-DestinationIdentity SL-SourceIdentity includes a Layer-2 ID of the second UE.

IE_related_to_target_UE_ID indicates the UE ID of the target UE. It includes C-RNTI of the first UE or SL-SourceIdentity. SL-SourceIdentity includes a Layer-2 ID of the first UE.

Ue_Type field indicates either type1 UE (target UE) or type2 UE (anchor UE). The first UE set this field with type1 UE.

sl_Pos_Rx_Interested field indicates "true". If this field is included, it indicates the UE is interested in SL-PRS reception. Alternatively, sl_Pos_Interested field can be used. The field indicates either transmission or reception or both.

In 2B-46 the first UE receives from the GNB a RRCReconfiguration message. The purpose is to provide the first UE with SL-PRS configuration.

The RRCReconfiguration message includes following IEs and fields.

One or more NR-SL PRS ResourceSet IE, a Sl_Pos_ResourcePool IE and a and a SL-RadioBearerConfig IE and SL-RLC-ChannelConfig IE and IE_related_to_anchor_UE_ID.

Instead of the Sl_Pos_ResourcePool IE, Sl_Pos_ResourcePoolID IE can be included to indicate the configuration of the resource pool for SL positioning. Sl_Pos_ResourcePoolID indicates a sl_Pos_ResourcePool indicated in the system information.

If resource pool for SL positioning is not configured, a pair of a SL BWP ID and a SL-ResourcePoolID can be included to indicate the configuration of the resource pool. The SL BWP ID and the SL-ResourcePoolID indicates a SL_ResourcePool indicated in the system information.

In 2B-51, the first UE transmits to the second UE a first SL MAC CE. The purpose is to request the second UE to activate the SL-PRS transmission.

The MAC subheader of first SL MAC CE includes following fields.

SRC field carries the 16 most significant bits of the Source Layer-2 ID set to the identifier provided by upper layers. The length of the field is 16 bits. It is 16 most significant bits of Layer-2 ID of the first UE.

DST field carries the 8 most significant bits of the Destination Layer-2 ID set to the identifier provided by upper layers. The length of the field is 8 bits. It is 8 most significant bits of Layer-2 ID of the second UE.

LCID field identifies the logical channel instance of the corresponding MAC SDU or the type of the corresponding MAC CE within the scope of one Source Layer-2 ID and Destination Layer-2 ID pair. This field is set to a first specific value corresponding to SL-PRS activation/deactivation request.

The first SL MAC CE includes following fields.

A/D field indicates whether to activate or deactivate indicated NR SL-PRS resource set. The field is set to 1 to indicate activation, otherwise it indicates deactivation. The first UE set this field to 1.

NR-SL_PRS_ResourceSet ID field contains an index of NR-SL_PRS_ResourceSet indicating the SL-PRS resource set, which shall be activated or deactivated. The length of the field is 4 bits.

Activation_Time field contains information on time point for desired activation time. A SFN (or DFN) number and a subframe number are indicated in the field. The first UE request the NR SL-PRS transmission in the earliest (or first) slot of the indicated subframe of the indicated SFN (or DFN).

The first SL MAC CE is transmitted on a resource pool configured by one of SL-ResourcePool IEs in the SIB12.

In 2B-56 the first UE receives from second UE a second SL MAC CE. The purpose is to let the first UE know that a NR SL PRS resource set is activated.

The second SL MAC CE includes following fields.

The MAC subheader of second SL MAC CE includes following fields.

SRC field carries the 16 most significant bits of the Source Layer-2 ID set to the identifier provided by upper layers. The length of the field is 16 bits. It is 16 most significant bits of Layer-2 ID of the second UE.

DST field carries the 8 most significant bits of the Destination Layer-2 ID set to the identifier provided by upper layers. The length of the field is 8 bits. It is 8 most significant bits of Layer-2 ID of the first UE.

LCID field identifies the logical channel instance of the corresponding MAC SDU or the type of the corresponding MAC CE within the scope of one Source Layer-2 ID and Destination Layer-2 ID pair. This field is set to a second specific value corresponding to SL-PRS activation/deactivation command.

The second SL MAC CE includes following fields.

A/D field indicates whether to activate or deactivate indicated NR SL-PRS resource set. The field is set to 1 to indicate activation, otherwise it indicates deactivation. The second UE set this field to 1.

NR-SL PRS ResourceSet ID field contains an index of NR-SL PRS ResourceSet indicating the SL-PRS resource set, which shall be activated or deactivated. The length of the field is 4 bits;

Activation_Time field contains information on time instance for activation time. A SFN (or DFN) number and a subframe number are indicated in the field. The second UE start the NR SL-PRS transmission in the earliest (or first) slot of the indicated subframe of the indicated SFN (or DFN).

The second SL MAC CE is received on a resource pool configured by one of SL-ResourcePool IEs in the SIB12.

The second UE transmits SL-PRS in the third symbols of the fourth slots on a first resource pool.

The first resource pool is configured by Sl_Pos_ResourcePool IE in RRCReconfigurationSidelink or in RRCReconfiguration.

Alternatively, the first resource pool is indicated by SL_Pos_ResourcePoolID IE in RRCReconfigurationSidelink or in RRCReconfiguration and configured by one of Sl_Pos_ResourcePool IEs in SIB12.

The second UE transmits the second MAC CE on the second resource pool. The second resource pool is configured by one of SL-ResourcePool IEs in the SIB12. The second resource pool is selected from one or more resource pools by the second UE.

The first UE receives and measures SL-PRS in the third symbols of the fourth slots on the first resource pool.

The first UE receives the second MAC CE on the second resource pool. The first UE monitors the third resource pools. The second resource pool is one of the third resource pools. The third resource pools are configured by SL-ResourcePool IEs in the SIB12.

In 2B-11, the second UE transmits SL-PRS. The first UE receives and measures SL-PRS. SL-PRS is transmitted according to the NR-SL_PRS_ResourceSet IE indicated by NR-SL_PRS_ResourceSet ID field in the second MAC CE.

The first UE receives and measures SL-PRS in the third symbols of the fourth slots on the first resource pool.

The second UE transmits SL-PRS in the third symbols of the fourth slots on the first resource pool.

The first UE and the second UE determines the second slots as below.

The second slots are all slots except the following slots.

slots in which S-SS/PSBCH block (S-SSB) is configured, and slots in each of which at least one of Y-th, (Y+1)-th, . . . , (Y+X−1)-th OFDM symbols are not semi-statically configured as UL as per the higher layer parameter tdd-UL-DL-ConfigurationCommon of the serving cell or sl-TDD-Configuration, where Y and X are set by the higher layer parameters sl-StartSymbol and sl-LengthSymbols, respectively.

The first UE and the second UE determines the third slots from the second slots based on the Sl_Pos_TimeResource.

The Sl_Pos_TimeResource is a bitmap. Each bit corresponds to a second slot. If a bit is set to 1, the second slot corresponding to the bit is a third slot.

The first UE and the second UE determines the fourth slots from the third slots based on SL_PRS_Periodicity-and-ResourceSetSlotOffset.

The fourth slots occur repeatedly, from the set of third slots, with the periodicity and the offset derived from SL_PRS_Periodicity-and-ResourceSetSlotOffset.

The first UE and the second UE determines the third symbols from the SL_PRS_NumSymbols and SL_PRS_ResourceSymbolOffset. The third symbols are consecutive symbols with length of SL_PRS_NumSymbols starting from the symbol indicated by SL_PRS_ResourceSymbolOffset.

After completing the measurement on SL-PRS, the first UE my request the second UE to deactivate the SL-PRS transmission.

In 2B-66, the first UE transmits to the second UE a first SL MAC CE. The purpose is to request the second UE to deactivate the SL-PRS transmission.

The A/D field of the first SL MAC CE is set to 0. If the A/D field is set to 0, Activation_Time field is not included in the first MAC CE.

In 2B-71, the second UE transmits to the first UE second SL MAC CE. The purpose is to let the first UE know that a NR SL PRS resource set is deactivated.

The A/D field of the second SL MAC CE is set to 0. If the A/D field is set to 0, Activation_Time field is not included in the first MAC CE.

In 2B-76, the first UE transmits to the LMF a third SPP message. The purpose is to report SL-PRS measurement result of the first UE (or target UE) to the LMF.

The third SPP message includes following fields and IEs.

SL_PRS_ID field is used along with a SL-PRS Resource Set ID and a SL-PRS Resources ID to uniquely identify a SL-PRS Resource.

IE_related_to_high_layer_anchor_UE_ID specifies the identifier of the anchor UE.

nr_pos_TimeStamp field specifies the time instance at which the TOA and SL PRS-RSRP/RSRPP (if included) measurement is performed. The nr-SFN and nr-Slot in IE NR_POS_TimeStamp correspond to the entity (i.e. anchor UE or GNB or TRP) provided in sl-PRS-ReferenceInfo.

nr-SL_PRS-RSRP-Result field specifies the NR SL-PRS reference signal received power (SL PRS-RSRP) measurement.

nr-los-nlos-IndicatorPerResource field specifies the target device's best estimate of the LOS or NLOS of the TOA measurement for the resource.

In 2B-81 the first UE transmits to the second UE a fourth SPP message. The purpose is to report SL-PRS measurement result of the first UE to the second UE. The second UE estimates the location of the first UE based on the SL-PRS measurement report from the first UE.

The fourth SPP message includes following fields.

SL_PRS_ID field is used along with a SL-PRS Resource Set ID and a SL-PRS Resources ID to uniquely identify a SL-PRS Resource.

nr_pos_TimeStamp field specifies the time instance at which the TOA and SL PRS-RSRP/RSRPP (if included) measurement is performed. The nr-SFN and nr-Slot in IE NR_POS_TimeStamp correspond to the entity (i.e. anchor UE or GNB or TRP) provided in sl-PRS-ReferenceInfo.

nr-SL_PRS-RSRP-Result field specifies the NR SL-PRS reference signal received power (SL PRS-RSRP) measurement.

nr-los-nlos-IndicatorPerResource field specifies the target device's best estimate of the LOS or NLOS of the TOA measurement for the resource.

In 2B-86 the second UE transmits to the LMF a third SPP message.

The third SPP message includes measurement results on SL-PRS provided by the first UE and the corresponding beam information available in the second UE and the location of the first UE estimated by the second UE based on the information.

The third SPP message includes following IEs and fields.

locationEstimate field provides a location estimate (derived based on SL-PRS measurement result reported from the target UE) using one of the geographic shapes.

velocityEstimate field provides a velocity estimate (derived based on SL-PRS measurement result reported from the target UE) using one of the velocity shapes.

SL_PRS_ID field is used along with a SL-PRS Resource Set ID and a SL-PRS Resources ID to uniquely identify a SL-PRS Resource.

IE_related_to_high_layer_target_UE_ID specifies the identifier of the target UE.

nr_pos_TimeStamp field specifies the time instance at which the TOA and SL PRS-RSRP/RSRPP (if included) measurement is performed. The nr-SFN and nr-Slot in IE NR_POS_TimeStamp correspond to the entity (i.e. anchor UE or GNB or TRP) provided in sl-PRS-ReferenceInfo.

nr-SL_PRS-RSRP-Result field specifies the NR SL-PRS reference signal received power (SL PRS-RSRP) measurement. It includes RSRP value and SL-PRS resource ID.

nr-los-nlos-IndicatorPerResource field specifies the target device's best estimate of the LOS or NLOS of the TOA measurement for the resource.

nr_SL_PRS_BeamInfo_List field specifies the beam information of each SL-PRS resource ID. One or more beam information are included in the nr_SL_PRS_BeamInfo_List field.

Each beam information includes following fields.

sl-PRS-Azimuth field specifies the azimuth angle of the boresight direction in which the SL-PRS Resources associated with this SL-PRS Resource ID in the SL-PRS Resource Set are transmitted by the anchor UE. Scale factor 1 degree; range 0 to 359 degrees.

SL-PRS-Azimuth-fine field provides finer granularity for the SL-PRS-Azimuth.

The total azimuth angle of the boresight direction is given by SL-PRS-Azimuth+SL-PRS-Azimuth-fine. Scale factor 0.1 degrees; range 0 to 0.9 degrees.

SL-PRS-Elevation field specifies the elevation angle of the boresight direction in which the SL-PRS Resources associated with this SL-PRS Resource ID in the SL-PRS Resource Set are transmitted by the anchor UE. Scale factor 1 degree; range 0 to 180 degrees.

SL-PRS-Elevation-fine field provides finer granularity for the SL-PRS-Elevation. The total elevation angle of the boresight direction is given by SL-PRS-Elevation+SL-PRS-Elevation-fine.

Scale factor 0.1 degrees; range 0 to 0.9 degrees.

In the following, UE operations are described.

The first UE receives a SIB12 in a first cell.

The first UE initiates sidelink positioning in the first cell if the SIB12 includes a sl-PositioningAllowed field set to a first value.

The first UE performs sidelink positioning based on a sidelink positioning resource pool if at least one sidelink positioning resource pool is indicated in the SIB12.

The first UE performs sidelink positioning based on a specific sidelink resource pool if sidelink positioning resource pool is not indicated in the SIB12. Configuration information of the specific sidelink resource pool includes sl_Pos_Allowed field set to a first value.

The first UE transmits to a LMF a ProvideCapabilities. The ProvideCapabilities includes an IE related to DL PRS and an IE related to SL PRS.

The IE related to DL PRS includes a supportOfDL-PRS-RSRP-MeasFR1 and a supportOfDL-PRS-RSRP-MeasFR2 field. The supportOfDL-PRS-RSRP-MeasFR1 field indicating whether the first UE supports DL-PRS measurement for RSRP in FR1. The supportOfDL-PRS-RSRP-MeasFR2 field indicates whether the first UE supports DL-PRS measurement for RSRP in FR2.

The IE related to SL PRS includes a supportOfSL_PRS_RSRP_MeasFR1 field and a supportOfSL_PRS_RSRP_MeasFR2 field and a supportOfSL_PRS_TxFR1 field and a supportOfSL_PRS_TxFR2 field.

The supportOfSL_PRS_RSRP_MeasFR1 field indicates whether the first UE supports SL-PRS measurement for RSRP in FR1.

The supportOfSL_PRS_RSRP_MeasFR2 field indicates whether the first UE supports SL-PRS measurement for RSRP in FR2.

The supportOfSL_PRS_TxFR1 field indicates whether the first UE supports SL-PRS transmission in FR1.

The supportOfSL_PRS_TxFR2 field indicates whether the first UE supports SL-PRS transmission in FR2.

The first UE receives from the second UE a first SPP message. The first SPP message includes the Pos_5G-S-TMSI of the second UE.

The Pos_5G-S-TMSI is a temporary UE identity provided by LMF

The RequestAssistanceData includes a Layer2-ID of the first terminal and a one or more Pos_5G-S-TMSIs. Each of the one or more Pos 5G-S-TMSIs indicates a candidate type2 terminal.

The first UE receives from the LMF a ProvideAssistanceData. The ProvideAssistanceData includes a Pos_5G-S-TMSI. The Pos_5G-S-TMSI corresponds to the second UE.

The first UE transmits to the LMF a RequestAssistanceData. The RequestAssistanceData includes a nr-AdType field. The nr-AdType field includes a bitmap. A specific bit of the bitmap indicates dl-prs and another specific bit of the bitmap indicates sl-prs.

The first UE receives from the LMF ProvideAssistanceData. The ProvideAssistanceData includes a Pos_5G-S-TMSI. The Pos_5G-S-TMSI corresponds to the type2 UE for sidelink positioning and SL-PRS.

The second UE receives from the LMF a second SPP message. The second SPP message includes a Pos_5G_S-TMSI. The Pos_5G-S-TMSI corresponds to the first UE for sidelink positioning and SL-PRS. The second SPP message includes a Layer-2 ID. The Layer-2 ID corresponds to the second UE for sidelink positioning and SL-PRS.

The second UE receives from the LMF a second SPP message. The second SPP message includes a preferred_SL_PRS IE. The preferred_SL_PRS includes a Resource_Pool_index_SL_PRS The first UE transmits to the second UE a UEAssistanceInformationSidelink message. The UEAssistanceInformationSidelink message includes a preferred_SL_PRS IE. The preferred_SL_PRS includes a Time_To_Complete and a Duration_SL_PRS and a Periodicity_SL_PRS and a Bandwidth_SL_PRS.

The first UE receives from the LMF a RequestLocationInformation. The RequestLocationInformation includes a pos_5G-S-TMSI of the second UE and a NR_SL_AssistanceAvailability field.

The first UE transmits to the second UE a UEAssistanceInformationSidelink. The UEAssistanceInformationSidelink includes a preferred_SL-PRS and a Pos_5G-S-TMSI of the first UE.

The second UE transmits to the GNB a SidelinkUEInformationNR. The SidelinkUEInformationNR includes ue_Type2 field and sl_Pos_Tx_Interested field.

The second UE receives from the GNB a RRCReconfiguration. The RRCReconfiguration includes one or more NR-SL_PRS_ResourceSet IE and a Sl_Pos_ResourcePool IE.

The second UE transmits to the first UE a RRCReconfigurationSidelink. The RRCReconfigurationSidelink includes one or more NR-SL_PRS_ResourceSet IE and a Sl_Pos_ResourcePool IE.

The second UE transmits to the first UE sidelink RRC message (or sidelink MAC CE) on the resource of first resource pool.

The second UE transmits to the first UE first sidelink signal on the resource of second resource pool The second UE transmits to the first UE second sidelink signal on the resource of third resource pool.

The first sidelink signal is Synchronization signal and the second sidelink signal is PRS.

The first resource pool is configured by a first SL-ResourcePool IE in SIB12. The second resource pool is configured by a second SL-ResourcePool IE in SIB12. The third resource pool is configured by a SL_Pos_ResourcePool IE in the RRCReconfigurationSidelink.

The SL-ResourcePool IE includes a sl-SubchannelSize field.

The granularity of frequency resource of the first resource pool is determined by the sl-SubchannelSize and the granularity of frequency resource of the third resource pool is fixed to 4 PRBs.

The first UE transmits to the second UE a first SL MAC CE. The first MAC CE includes a A/D field and a NR-SL_PRS_ResourceSet ID field and a Activation_Time field.

The first UE receives from the second UE a second SL MAC CE. The second MAC CE includes a A/D field and a NR-SL_PRS_ResourceSet ID field and a Activation_Time field.

The first UE starts to measure SL-PRS based on the NR-SL_PRS_ResourceSet ID field from the time point determined based on the Activation_Time field.

The first UE transmits to the LMF a third SPP message. The third SPP message includes an IE_related_to_high_layer_anchor_UE_ID field and a nr_pos_TimeStamp field and a nr-SL_PRS-RSRP-Result field.

The second UE receives from the first UE a fourth SPP message. The fourth SPP message includes a nr_pos_TimeStamp field and a nr-SL_PRS-RSRP-Result field.

The second UE transmits to GNB a third SPP message. The third SPP message includes a nr_pos_TimeStamp field and a nr-SL_PRS-RSRP-Result field and an IE_related_to_high_layer_target_UE_ID field and a nr_SL_PRS_BeamInfo_List field.

The second UE determines the second slots based on a TDD-UL-DL-ConfigCommon IE indicated in a SIB1 and a Sl_Pos_LengthSymbols and a Sl_Pos_StartSymbol indicated in SL_Pos_ResourcePool and S-SS/PSBCH block.

The second UE determines the third slots from the second slots based on sl_Pos_TimeResource.

The second UE determines the fourth slots based on SL_PRS_Periodicity-and-ResourceSetSlotOffset indicated in the SL_Pos_ResourcePool IE.

The second UE determines the third symbols based on SL_PRS NumSymbols and SL_PRS_ResourceSymbolOffset in a NR-SL_PRS_ResourceSet IE.

The second UE transmits SL-PRS in the third symbols in the fourth slots.

The TDD-UL-DL-ConfigCommon IE is included in SIB1 and SL_Pos_ResourcePool IE is included in SIB12 and NR-SL PRS ResourceSet IE is included in a RRCReconfigurationSidelink.

The first UE determines the second slots based on a TDD-UL-DL-ConfigCommon IE indicated in a SIB1 and a Sl_Pos_LengthSymbols and a Sl_Pos_StartSymbol indicated in a SL_Pos_ResourcePool IE and S-SS/PSBCH block.

A second slots are determined based on a TDD-UL-DL-ConfigCommon IE indicated in a SIB1 and a Sl_Pos_LengthSymbols and a Sl_Pos_StartSymbol indicated in SL_Pos_ResourcePool and presence of a second Synchronization Signal.

A third slots are determined from the second slots based on sl_Pos_TimeResource.

the fourth slots are determined based on SL_PRS_Periodicity-and-ResourceSetSlotOffset indicated in the SL_Pos_ResourcePool IE.

The first slots are determined based on dl-PRS-Periodicity-and-ResourceSetSlotOffset in nr-DL-PRS-AssistanceData.

A first symbols are determined based on dl-PRS-ResourceSymbolOffset and dl-PRS-NumSymbols in nr-DL-PRS-AssistanceData.

The second symbols are determined from the first symbols based on presence of a first synchronization signal.

The first UE receives DL-PRS in the second symbols in the first slots.

The TDD-UL-DL-ConfigCommon IE is included in SIB1 and SL_Pos_ResourcePool IE is included in SIB12 and NR-SL_PRS_ResourceSet IE is included in a RRCReconfigurationSidelink and nr-DL-PRS-AssistanceData is included in ProvideAssistanceData.

The first UE transmits measurement result on PRS to either the LMF or the second UE.

The measurement result on PRS is reported to the LMF via uplink if the PRS Is DL-PRS and the measurement result on PRS is reported to the second UE via sidelink if the PRS is SL-PRS.

Figure 3A:
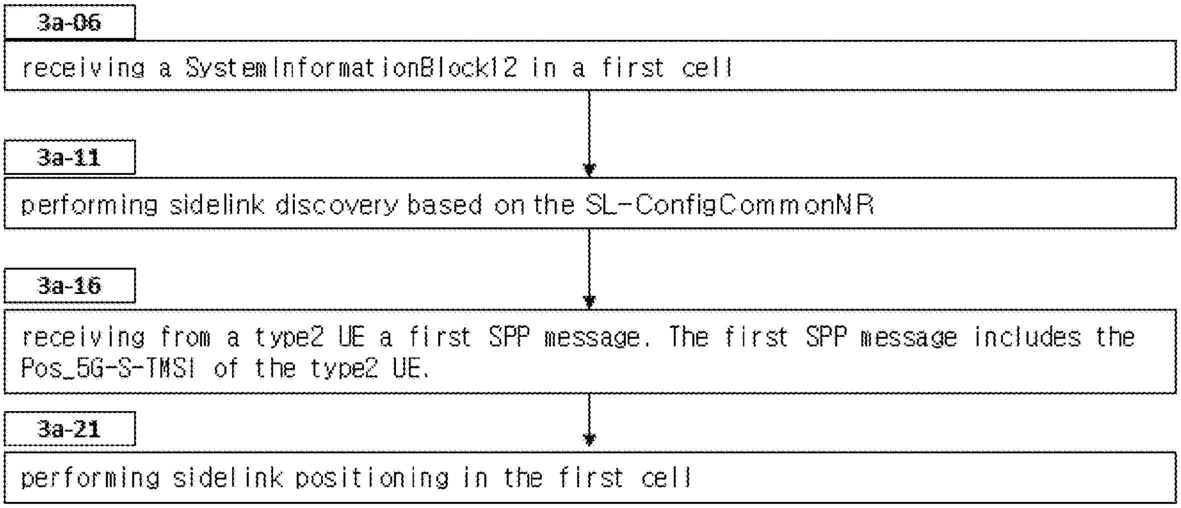
FIG. 3A is a flow diagram illustrating operations of a terminal and a base station according to an embodiment of the present invention.

FIG. 3A is a diagram illustrating an operation of a terminal.

In 3A-06, the type1 UE receives a SystemInformationBlock12 in a first cell. The SystemInformationBlock12 includes a SL-ConfigCommonNR and a SL_Pos_ConfigCommon. The SL_Pos_ConfigCommon includes a one or more Sl_Pos_ResourcePool IEs.

In 3A-11, the type1 UE performs sidelink discovery based on the SL-ConfigCommonNR.

In 3A-16, the type1 UE receives from a type2 UE a first SPP message. The type2 UE is identified during the sidelink discovery. The first SPP message includes the Pos_5G-S-TMSI of the type2 UE. The Pos_5G-S-TMSI is a temporary terminal identity provided by LMF In 3A-21, the type1 UE performs sidelink positioning in the first cell based on the Pos_5G-S-TMSI and a Sl_Pos_ResourcePool IE of the one or more Sl_Pos_ResourcePool IEs.

Figure 4A:
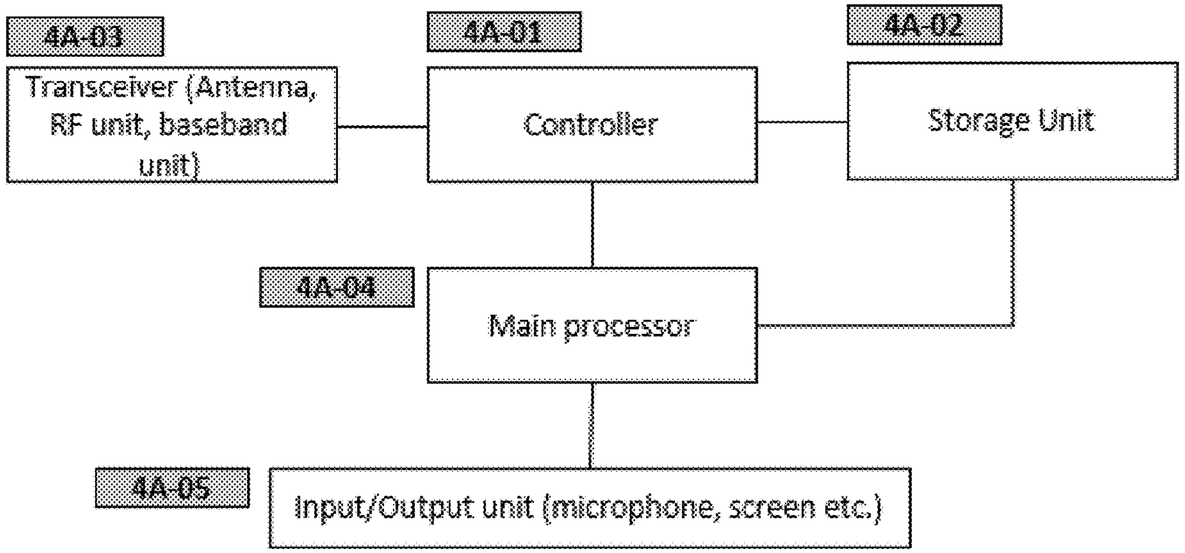
FIG. 4A is a block diagram illustrating the internal structure of a UE according to the disclosure.

FIG. 4A is a block diagram illustrating the internal structure of a UE to which the disclosure is applied.

Referring to the diagram, the UE includes a controller 4A-01, a storage unit 4A-02, a transceiver 4A-03, a main processor 4A-04 and I/O unit 4A-05.

The controller 4A-01 controls the overall operations of the UE in terms of mobile communication. For example, the controller 4A-01 receives/transmits signals through the transceiver 4A-03. In addition, the controller 4A-01 records and reads data in the storage unit 4A-02. To this end, the controller 4A-01 includes at least one processor. For example, the controller 4A-01 may include a communication processor (CP) that performs control for communication and an application processor (AP) that controls the upper layer, such as an application program. The controller controls storage unit and transceiver such that UE operations illustrated in FIG. 2A and FIG. 2B and FIG. 3A are performed.

The storage unit 4A-02 stores data for operation of the UE, such as a basic program, an application program, and configuration information. The storage unit 4A-02 provides stored data at a request of the controller 4A-01.

The transceiver 4A-03 consists of a RF processor, a baseband processor and plurality of antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down—converts an RF band signal received through the antenna into a baseband signal. The RF processor may include a transmission filter, a reception filter, an amplifier, a mi10r, an oscillator, a digital-to-analog converter (DAC), an analog-to-digital converter (ADC), and the like. The RF processor may perform MIMO and may receive multiple layers when performing the MIMO operation. The baseband processor performs a function of conversion between a baseband signal and a bit string according to the physical layer specification of the system. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The main processor 4A-04 controls the overall operations other than mobile operation. The main processor 4A-04 process user input received from I/O unit 4A-05, stores data in the storage unit 4A-02, controls the controller 4A-01 for required mobile communication operations and forward user data to I/O unit 4A-05.

I/O unit 4A-05 consists of equipment for inputting user data and for outputting user data such as a microphone and a screen. I/O unit 4A-05 performs inputting and outputting user data based on the main processor's instruction.

Figure 4B:
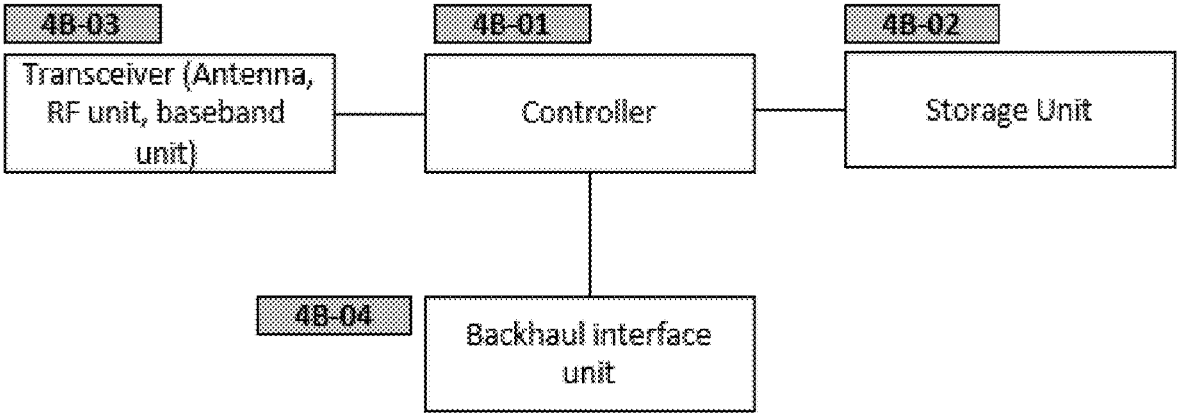
FIG. 4B is a block diagram illustrating the configuration of a base station according to the disclosure.

FIG. 4B is a block diagram illustrating the configuration of a base station according to the disclosure.

As illustrated in the diagram, the base station includes a controller 4B-01, a storage unit 4B-02, a transceiver 4B-03 and a backhaul interface unit 4B-04.

The controller 4B-01 controls the overall operations of the main base station. For example, the controller 4B-01 receives/transmits signals through the transceiver 4B-03, or through the backhaul interface unit 4B-04. In addition, the controller 4B-01 records and reads data in the storage unit 4B-02. To this end, the controller 4B-01 may include at least one processor. The controller controls transceiver, storage unit and backhaul interface such that base station operation illustrated in FIG. 2A and FIG. 2B are performed.

The storage unit 4B-02 stores data for operation of the main base station, such as a basic program, an application program, and configuration information. Particularly, the storage unit 4B-02 may store information regarding a bearer allocated to an accessed UE, a measurement result reported from the accessed UE, and the like. In addition, the storage unit 4B-02 may store information serving as a criterion to deter mine whether to provide the UE with multi-connection or to discontinue the same. In addition, the storage unit 4B-02 provides stored data at a request of the controller 4B-01.

The transceiver 4B-03 consists of a RF processor, a baseband processor and plurality of antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down—converts an RF band signal received through the antenna into a baseband signal. The RF processor may include a transmission filter, a reception filter, an amplifier, a mi10r, an oscillator, a DAC, an ADC, and the like. The RF processor may perform a down link MIMO operation by transmitting at least one layer. The baseband processor performs a function of conversion between a baseband signal and a bit string according to the physical layer specification of the first radio access technology. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The backhaul interface unit 4B-04 provides an interface for communicating with other nodes inside the network. The backhaul interface unit 4B-04 converts a bit string transmitted from the base station to another node, for example, another base station or a core network, into a physical signal, and converts a physical signal received from the other node into a bit string.

What is claimed is:

1. A method performed by a terminal, the method comprising:
- receiving, by the terminal from a base station, a specific system information block (SIB), wherein:
  - the specific SIB comprises one or more sets of resource pool parameters; and
  - each set of the one or more sets of resource pool parameters comprises a bitmap related to Sidelink Positioning Reference Signal (SL-PRS) resource pool during a Direct Frame Number (DFN) cycle;
- transmitting, by the terminal to the base station, a specific uplink message, wherein the specific uplink message comprises:
  - a parameter related to sidelink positioning reception interest;
  - a parameter related to sidelink destination identity;
  - a parameter related to delay of SL-PRS; and
  - a parameter related to bandwidth of SL-PRS; and
- performing, by the terminal, SL-PRS operation based on one or more SL-PRS resource pools configured by the one or more sets of resource pool parameters.

2. The method of claim 1, wherein the specific SIB further comprises:
- a field indicating the number of symbols used for sidelink in a slot without sidelink synchronization signal block (SSB); and
- a field indicating a starting symbol used for sidelink in the slot without sidelink SSB.

3. The method of claim 1,
- wherein the specific SIB further comprises a subcarrier spacing parameter indicating a specific subcarrier spacing for one or more SL-PRS resource pools that are configured by the one or more sets of resource pool parameters.

4. A terminal in a wireless communication system, the terminal comprising:
- a transceiver configured to transmit and receive a signal; and
- a controller configured to control the transceiver to:
  - receive from a base station a specific system information block (SIB), wherein:
    - the specific SIB comprises one or more sets of resource pool parameters; and
    - each set of the one or more sets of resource pool parameters comprises a bitmap related to Sidelink Positioning Reference Signal (SL-PRS) resource pool during a Direct Frame Number (DFN) cycle,
  - transmit to the base station a specific uplink message, wherein the specific uplink message comprises:
    - a parameter related to sidelink positioning reception interest;
    - a parameter related to sidelink destination identity;
    - a parameter related to delay of SL-PRS; and
    - a parameter related to bandwidth of SL-PRS, and
  - perform SL-PRS operation based on one or more SL-PRS resource pools configured by the one or more sets of resource pool parameters.

* * * * *